(12) United States Patent
Jung et al.

(10) Patent No.: US 12,247,778 B2
(45) Date of Patent: Mar. 11, 2025

(54) VACUUM ADIABATIC BODY AND REFRIGERATOR

(71) Applicant: LG ELECTRONICS INC., Seoul (KR)

(72) Inventors: Wonyeong Jung, Seoul (KR); Deokhyun Youn, Seoul (KR); Bongjin Kim, Seoul (KR); Jaehyun Bae, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 127 days.

(21) Appl. No.: 18/034,963

(22) PCT Filed: Nov. 1, 2021

(86) PCT No.: PCT/KR2021/015519
§ 371 (c)(1),
(2) Date: May 2, 2023

(87) PCT Pub. No.: WO2022/092943
PCT Pub. Date: May 5, 2022

(65) Prior Publication Data
US 2024/0019199 A1    Jan. 18, 2024

(30) Foreign Application Priority Data

Nov. 2, 2020    (KR) .................. 10-2020-0144776

(51) Int. Cl.
*F16L 59/065*    (2006.01)
*F25D 23/06*    (2006.01)

(52) U.S. Cl.
CPC .......... *F25D 23/063* (2013.01); *F16L 59/065* (2013.01); *F25D 2201/14* (2013.01); *Y10T 428/231* (2015.01)

(58) Field of Classification Search
None
See application file for complete search history.

(56) References Cited

FOREIGN PATENT DOCUMENTS

| CN | 106828612 | 6/2017 |
|----|-----------|--------|
| JP | 11-310236 | 11/1999 |

(Continued)

OTHER PUBLICATIONS

International Search Report dated Feb. 11, 2022 issued in Application No. PCT/KR2021/015519.

*Primary Examiner* — Alexander S Thomas
(74) *Attorney, Agent, or Firm* — KED & ASSOCIATES, LLP

(57) ABSTRACT

A vacuum adiabatic body of the present embodiment may include a first plate, a second plate, a seal configured to seal the first plate and the second plate to provide a vacuum space, and a support configured to maintain the vacuum space. Alternatively, the support may include a first support having a first support plate formed in a grid shape, and a plurality of spacer coupling portions configured to protrude from the first support plate. Alternatively, the support may include a second support having a second support plate formed in a grid shape, and a plurality of spacers protruding from the second support plate and coupled to each of the plurality of spacer coupling parts to form a plurality of bars together with the plurality of spacer coupling parts. Alternatively, the support may include a radiation resistance sheet supported by a portion of the plurality of bars and spaced apart from at least one of the first support plate and the second support plate. Alternatively, each of the support plates may include a plurality of through-holes. Alternatively, a plurality of distribution structures generated after injection molding the first and second supports and spaced (Continued)

apart from each other may be provided in some of the plurality of through-holes of each support plate.

20 Claims, 23 Drawing Sheets

(56) References Cited

FOREIGN PATENT DOCUMENTS

| KR | 10-0985432 | 10/2010 |
| KR | 10-2013-0048527 | 5/2013 |
| KR | 10-2019-0013338 | 2/2019 |
| KR | 10-2019-0018835 | 2/2019 |

FIG. 3
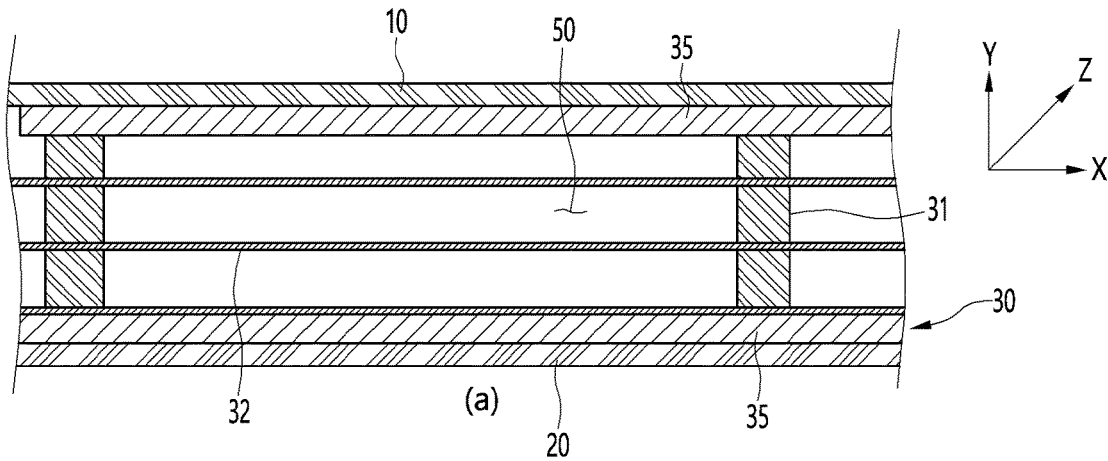
(a)
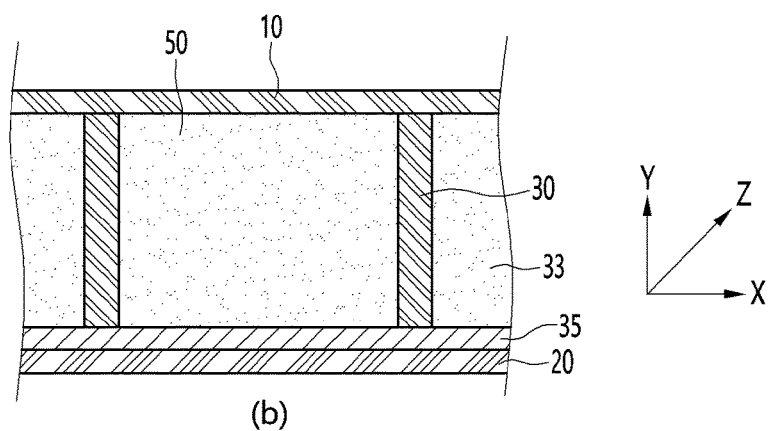
(b)
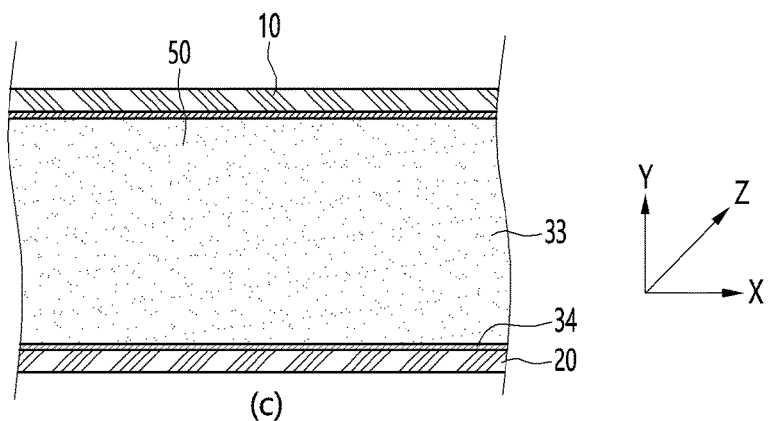
(c)

FIG. 5
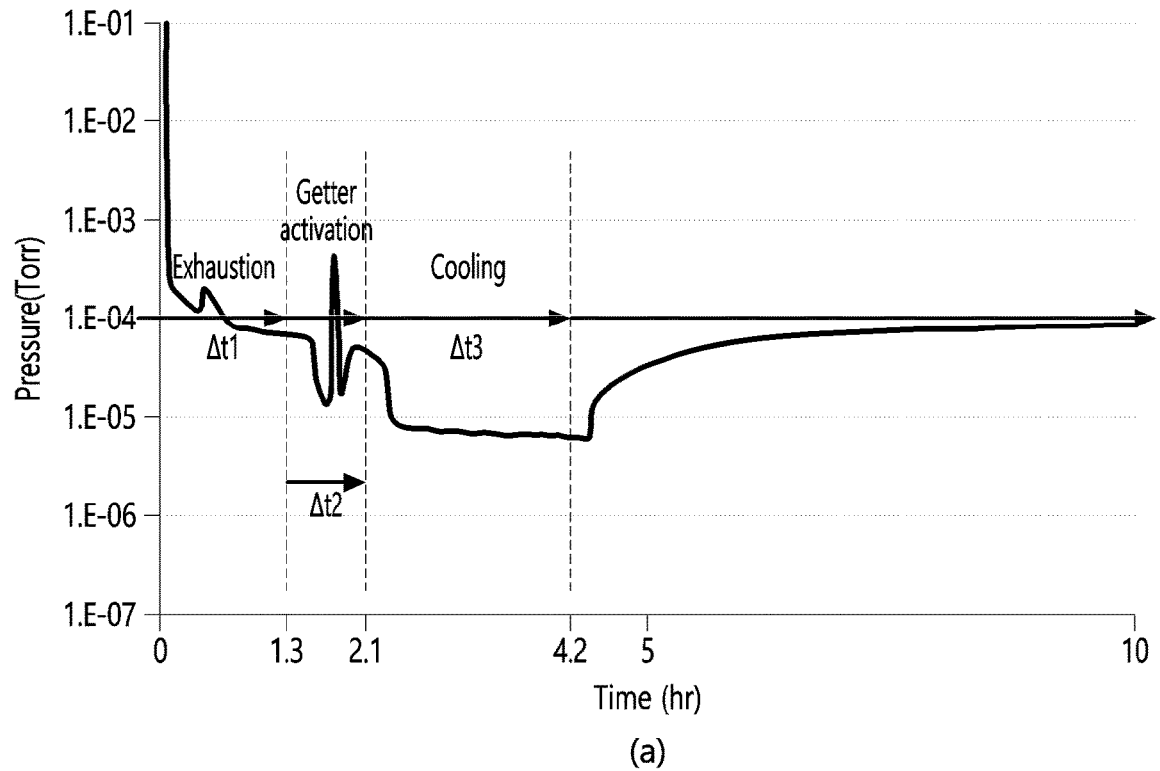
(a)
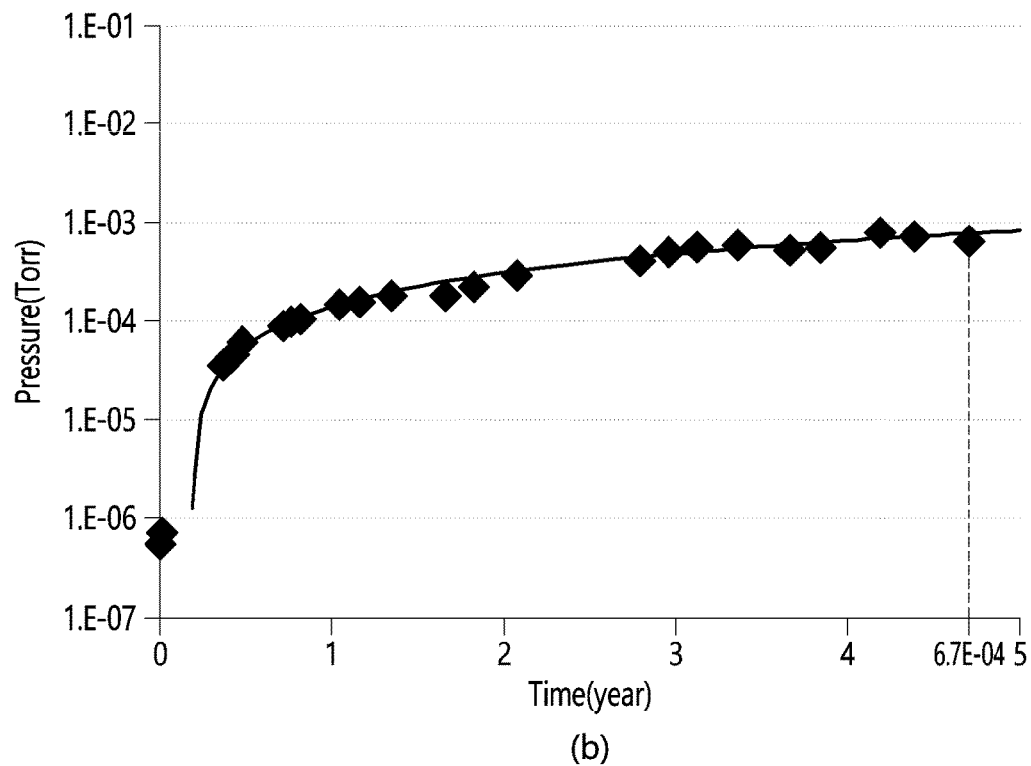
(b)

VACUUM ADIABATIC BODY AND REFRIGERATOR

CROSS-REFERENCE TO RELATED PATENT APPLICATIONS

This application is a U.S. National Stage Application under 35 U.S.C. § 371 of PCT Application No. PCT/KR2021/015519, filed Nov. 1, 2021, which claims priority to Korean Patent Application No. 10-2020-0144776, filed Nov. 2, 2020, whose entire disclosures are hereby incorporated by reference.

TECHNICAL FIELD

The present disclosure relates to a vacuum adiabatic body and a refrigerator.

BACKGROUND ART

Adiabatic performance can be improved by constructing an adiabatic wall with vacuum. At least a portion of the internal space is made of vacuum, and a device for forming to obtain an adiabatic effect may be referred to as a vacuum adiabatic body.

The applicant has developed a technology to obtain a vacuum adiabatic body that can be used in various devices and home appliances and disclosed a refrigerator having a vacuum space of Korean Application No. 10-2011-0113413 (Publication No. 10-2013-0048527).

The refrigerator includes a body having a storage space in which a predetermined stored items can be accommodated, wherein the body includes an inner case in which the storage space is formed; an outer case accommodating the inner case and disposed to be spaced apart from the inner case by a predetermined gap; a vacuum space provided between the inner case and the outer case, the inside of which is sealed and maintained in a vacuum state, to perform an adiabatic action between the inner case and the outer case; a first support plate provided on one of the surfaces facing each other of the inner case and the outer case; and a plurality of spacers which are fixedly disposed on the first support plate and support to maintain a gap between the inner case and the outer case.

The body further includes a second support plate provided on the other of the surfaces facing each other of the inner case and the outer case and disposed to face the first support plate.

The second support plate includes a plurality of grooves formed so that the end portions of the plurality of spaces are inserted into the inner surface thereof.

In this prior document, the first support plate only includes spacers of the same shape, and a specific technique for reducing heat transfer between the support plates is not disclosed.

In addition, the prior document discloses only that the first support plate includes a plurality of spacers and does not disclose a technique for uniformly forming each of the plurality of spacers in the first support plate.

DISCLOSURE OF INVENTION

Technical Problem

The present embodiment provides a vacuum adiabatic body and a refrigerator in which some of the plurality of bars of the support are prevented from being unmolded.

Optionally or additionally, the present embodiment provides a vacuum adiabatic body and a refrigerator that can be injection molded into a desired shape in the shape of a plurality of bars of the support.

In addition to the examples presented above, the present disclosure proposes specific solutions and means for solving them in [Technical Solution] and [Mode for Invention].

Solution to Problem

A vacuum adiabatic body according to an aspect may include a first plate, a second plate, a seal configured to seal the first plate and the second plate to provide a vacuum space, and a support configured to maintain the vacuum space.

Optionally, the support may include a first support having a first support plate formed in a grid shape, and a plurality of spacer coupling portions configured to protrude from the first support plate. Optionally, the support may include a second support having a second support plate formed in a grid shape, and a plurality of spacers protruding from the second support plate and coupled to each of the plurality of spacer coupling parts to form a plurality of bars together with the plurality of spacer coupling parts. Optionally, the support may include a radiation resistance sheet supported by a portion of the plurality of bars and spaced apart from at least one of the first support plate and the second support plate.

Optionally, each of the support plates may include a plurality of through-holes. Optionally, a plurality of distribution structures generated after injection molding the first and second supports and spaced apart from each other may be provided in some of the plurality of through-holes of each support plate.

Optionally, in a state in which the first support and the second support are coupled, the distribution structure of the first support may be disposed at a position that does not overlap the distribution structure of the second support.

Optionally, a plurality of distribution structures may be disposed to be symmetrical with respect to a point of the bisector based on a bisector that bisects each of the support plates.

Optionally, the number of through-holes between two adjacent distribution structures may be 5 or more and 8 or less.

Optionally, the plurality of distribution structures may include a plurality of outer structures positioned adjacent to a corner in each of the first and second supports and a plurality of inner structures positioned in an area formed by an imaginary line connecting the plurality of outer structures.

Optionally, the distance between two adjacent outer structures may be longer than the distance between two adjacent inner structures.

Optionally, the number of the outer structure may be greater than the number of the inner structure.

Optionally, the plurality of inner structures may include a first inner structure positioned on one side based on a bisector that bisects each support plate, and a second inner structure positioned on the other side of the bisector.

Optionally, the distance between the first inner structure and the bisector may be the same as the distance between the second inner structure and the bisector.

Optionally, the number of through-holes between the first inner structure and one outer structure adjacent to the first inner structure may be same as the number of through-holes between the second inner structure and the other outer structure adjacent to the second inner structure.

Optionally, the plurality of distribution structures may include a first group including the plurality of inner structures, a second group including a plurality of outer structures positioned on one side of the first group, and a third group including a plurality of outer structures positioned on the other side of the first group.

Optionally, the number of distribution structures of at least one of the second group and the third group may be greater than the number of distribution structures of the first group.

Optionally, at least one of the distance between the distribution structures of the first group and the distance between the distribution structures of the second group may be greater than the distance between the distribution structures of the second group.

Optionally, the area of the triangle connecting the two inner structures and the one outer structure may be larger than the area of the triangle connecting the two outer structures and the one inner structure.

Optionally, one through-hole may be defined by a pair of first expansion portions and a pair of second expansion portions. Optionally, the distribution structure may include a support distribution portion located in the through-hole, and a support bridge extending from the support distribution portion in a radial direction and connected to at least one of the pair of first expansion portions and the pair of second expansion portions.

Optionally, the refrigerator of this embodiment may include the vacuum adiabatic body described above.

Advantageous Effects of Invention

According to the present embodiment, since the distribution structure is located in the through-hole, the injection liquid is evenly distributed in the mold during the injection molding process of the support, so that some of the plurality of bars are prevented from being unmolded.

According to the present embodiment, since the plurality of distribution structures exist, the injection liquid is distributed into the mold through the plurality of gates, so that the shape of the plurality of bars can be injection molded into a required shape.

According to the present embodiment, since the distribution structure is located in the through-hole, the injection liquid is distributed in multiple directions by the bridge, so that the shape of a plurality of bars can be injection molded into a required shape.

BRIEF DESCRIPTION OF DRAWINGS

FIG. 3 is a view illustrating an embodiment of a support for maintaining a vacuum space, FIG. 5 is a graph for observing the process of evacuating the inside of the vacuum adiabatic body with time and pressure when the support is used.

MODE FOR THE INVENTION

Figure 1:
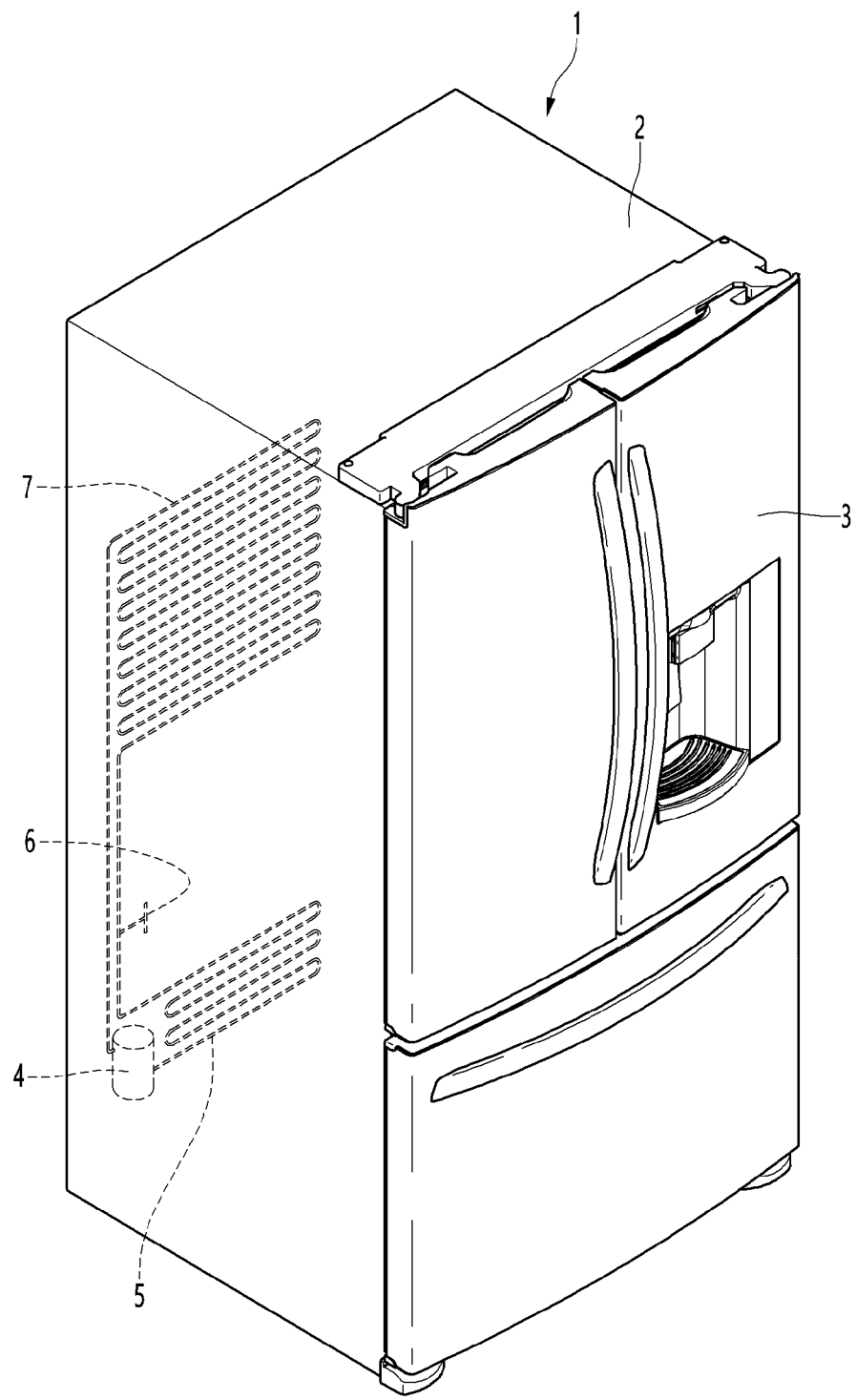
FIG. 1 is a perspective view illustrating a refrigerator according to an embodiment.

Hereinafter, specific embodiments will be described in detail with reference to the accompanying drawings. The invention may, however, be embodied in many different forms and should not be construed as being limited to the embodiments set forth herein, and a person of ordinary skill in the art, who understands the spirit of the present invention, may readily implement other embodiments included within the scope of the same concept by adding, changing, deleting, and adding components; rather, it will be understood that they are also included within the scope of the present invention. The present invention may have many embodiments in which the idea is implemented, and in each embodiment, any portion may be replaced with a corresponding portion or a portion having a related action according to another embodiment. The present invention may be any one of the examples presented below or a combination of two or more examples.

The present disclosure relates to a vacuum adiabatic body including a first plate; a second plate; a vacuum space defined between the first and second plates; and a seal providing the vacuum space that is in a vacuum state. The vacuum space may be a space in a vacuum state provided in an internal space between the first plate and the second plate. The seal may seal the first plate and the second plate to provide the internal space provided in the vacuum state. The vacuum adiabatic body may optionally include a side plate connecting the first plate to the second plate. In the present disclosure, the expression "plate" may mean at least one of the first and second plates or the side plate. At least a portion of the first and second plates and the side plate may be integrally provided, or at least portions may be sealed to each other. Optionally, the vacuum adiabatic body may include a support that maintains the vacuum space. The vacuum adiabatic body may selectively include a thermal insulator that reduces an amount of heat transfer between a first space provided in vicinity of the first plate and a second space provided in vicinity of the second plate or reduces an amount of heat transfer between the first plate and the second plate. Optionally, the vacuum adiabatic body may include a component coupling portion provided on at least a portion of the plate. Optionally, the vacuum adiabatic body may include another adiabatic body. Another adiabatic body may be provided to be connected to the vacuum adiabatic body. Another adiabatic body may be an adiabatic body having a degree of vacuum, which is equal to or different from a degree of vacuum of the vacuum adiabatic body. Another adiabatic body may be an adiabatic body that does not include a degree of vacuum less than that of the vacuum adiabatic body or a portion that is in a vacuum state therein. In this case, it may be advantageous to connect another object to another adiabatic body.

In the present disclosure, a direction along a wall defining the vacuum space may include a longitudinal direction of the vacuum space and a height direction of the vacuum space. The height direction of the vacuum space may be defined as any one direction among virtual lines connecting the first space to the second space to be described later while passing through the vacuum space. The longitudinal direction of the vacuum space may be defined as a direction perpendicular to the set height direction of the vacuum space. In the present disclosure, that an object A is connected to an object B means that at least a portion of the object A and at least a portion of the object B are directly connected to each other, or that at least a portion of the object A and at least a portion of the object B are connected to each other through an intermedium interposed between the objects A and B. The intermedium may be provided on at least one of the object A or the object B. The connection may include that the object A is connected to the intermedium, and the intermedium is connected to the object B. A portion of the intermedium may include a portion connected to either one of the object A and the object B. The other portion of the intermedium may include a portion connected to the other of the object A and the object B. As a modified example, the connection of the object A to the object B may include that the object A and the object B are integrally prepared in a shape connected in the above-described manner. In the present disclosure, an embodiment of the connection may be support, combine, or a seal, which will be described later. In the present disclosure, that the object A is supported by the object B means that the object A is restricted in movement by the object B in one or more of the +X, −X, +Y, −Y, +Z, and −Z axis directions. In the present invention, an embodiment of the support may be the combine or seal, which will be described later. In the present invention, that the object A is combined with the object B may define that the object A is restricted in movement by the object B in one or more of the X, Y, and Z-axis directions. In the present disclosure, an embodiment of the combining may be the sealing to be described later. In the present disclosure, that the object A is sealed to the object B may define a state in which movement of a fluid is not allowed at the portion at which the object A and the object B are connected. In the present disclosure, one or more objects, i.e., at least a portion of the object A and the object B, may be defined as including a portion of the object A, the whole of the object A, a portion of the object B, the whole of the object B, a portion of the object A and a portion of the object B, a portion of the object A and the whole of the object B, the whole of the object A and a portion of the object B, and the whole of the object A and the whole of the object B. In the present disclosure, that the plate A may be a wall defining the space A may be defined as that at least a portion of the plate A may be a wall defining at least a portion of the space A. That is, at least a portion of the plate A may be a wall forming the space A, or the plate A may be a wall forming at least a portion of the space A. In the present disclosure, a central portion of the object may be defined as a central portion among three divided portions when the object is divided into three sections based on the longitudinal direction of the object. A periphery of the object may be defined as a portion disposed at a left or right side of the central portion among the three divided portions. The periphery of the object may include a surface that is in contact with the central portion and a surface opposite thereto. The opposite side may be defined as a border or edge of the object. Examples of the object may include a vacuum adiabatic body, a plate, a heat transfer resistor, a support, a vacuum space, and various components to be introduced in the present disclosure. In the present disclosure, a degree of heat transfer resistance may indicate a degree to which an object resists heat transfer and may be defined as a value determined by a shape including a thickness of the object, a material of the object, and a processing method of the object. The degree of the heat transfer resistance may be defined as the sum of a degree of conduction resistance, a degree of radiation resistance, and a degree of convection resistance. The vacuum adiabatic body according to the present disclosure may include a heat transfer path defined between spaces having different temperatures, or a heat transfer path defined between plates having different temperatures. For example, the vacuum adiabatic body according to the present disclosure may include a heat transfer path through which cold is transferred from a low-temperature plate to a high-temperature plate. In the present disclosure, when a curved portion includes a first portion extending in a first direction and a second portion extending in a second direction different from the first direction, the curved portion may be defined as a portion that connects the first portion to the second portion (including 90 degrees).

In the present disclosure, the vacuum adiabatic body may optionally include a component coupling portion. The component coupling portion may be defined as a portion provided on the plate to which components are connected to each other. The component connected to the plate may be defined as a penetration portion disposed to pass through at least a portion of the plate and a surface component disposed to be connected to a surface of at least a portion of the plate. At least one of the penetration component or the surface component may be connected to the component coupling portion. The penetration component may be a component that defines a path through which a fluid (electricity, refrigerant, water, air, etc.) passes mainly. In the present disclosure, the fluid is defined as any kind of flowing material. The fluid includes moving solids, liquids, gases, and electricity. For example, the component may be a component that defines a path through which a refrigerant for heat exchange passes, such as a suction line heat exchanger (SLHX) or a refrigerant tube. The component may be an electric wire that supplies electricity to an apparatus. As another example, the component may be a component that defines a path through which air passes, such as a cold duct, a hot air duct, and an exhaust port. As another example, the component may be a path through which a fluid such as coolant, hot water, ice, and defrost water pass. The surface component may include at least one of a peripheral adiabatic body, a side panel, injected foam, a pre-prepared resin, a hinge, a latch, a basket, a drawer, a shelf, a light, a sensor, an evaporator, a front decor, a hotline, a heater, an exterior cover, or another adiabatic body.

As an example to which the vacuum adiabatic body is applied, the present disclosure may include an apparatus having the vacuum adiabatic body. Examples of the apparatus may include an appliance. Examples of the appliance may include home appliances including a refrigerator, a cooking appliance, a washing machine, a dishwasher, and an air conditioner, etc. As an example in which the vacuum adiabatic body is applied to the apparatus, the vacuum adiabatic body may constitute at least a portion of a body and a door of the apparatus. As an example of the door, the vacuum adiabatic body may constitute at least a portion of a general door and a door-in-door (DID) that is in direct contact with the body. Here, the door-in-door may mean a small door placed inside the general door. As another example to which the vacuum adiabatic body is applied, the present disclosure may include a wall having the vacuum adiabatic body. Examples of the wall may include a wall of a building, which includes a window.

Hereinafter, the present disclosure will be described in detail with reference to the accompanying drawings. Each of the drawings accompanying the embodiment may be different from, exaggerated, or simply indicated from an actual article, and detailed components may be indicated with simplified features. The embodiment should not be interpreted as being limited only to the size, structure, and shape presented in the drawings. In the embodiments accompanying each of the drawings, unless the descriptions conflict with each other, some configurations in the drawings of one embodiment may be applied to some configurations of the drawings in another embodiment, and some structures in one embodiment may be applied to some structures in another embodiment. In the description of the drawings for the embodiment, the same reference numerals may be assigned to different drawings as reference numerals of specific components constituting the embodiment. Components having the same reference number may perform the same function. For example, the first plate constituting the vacuum adiabatic body has a portion corresponding to the first space throughout all embodiments and is indicated by reference number 10. The first plate may have the same number for all embodiments and may have a portion corresponding to the first space, but the shape of the first plate may be different in each embodiment. Not only the first plate, but also the side plate, the second plate, and another adiabatic body may be understood as well.

Figure 2:
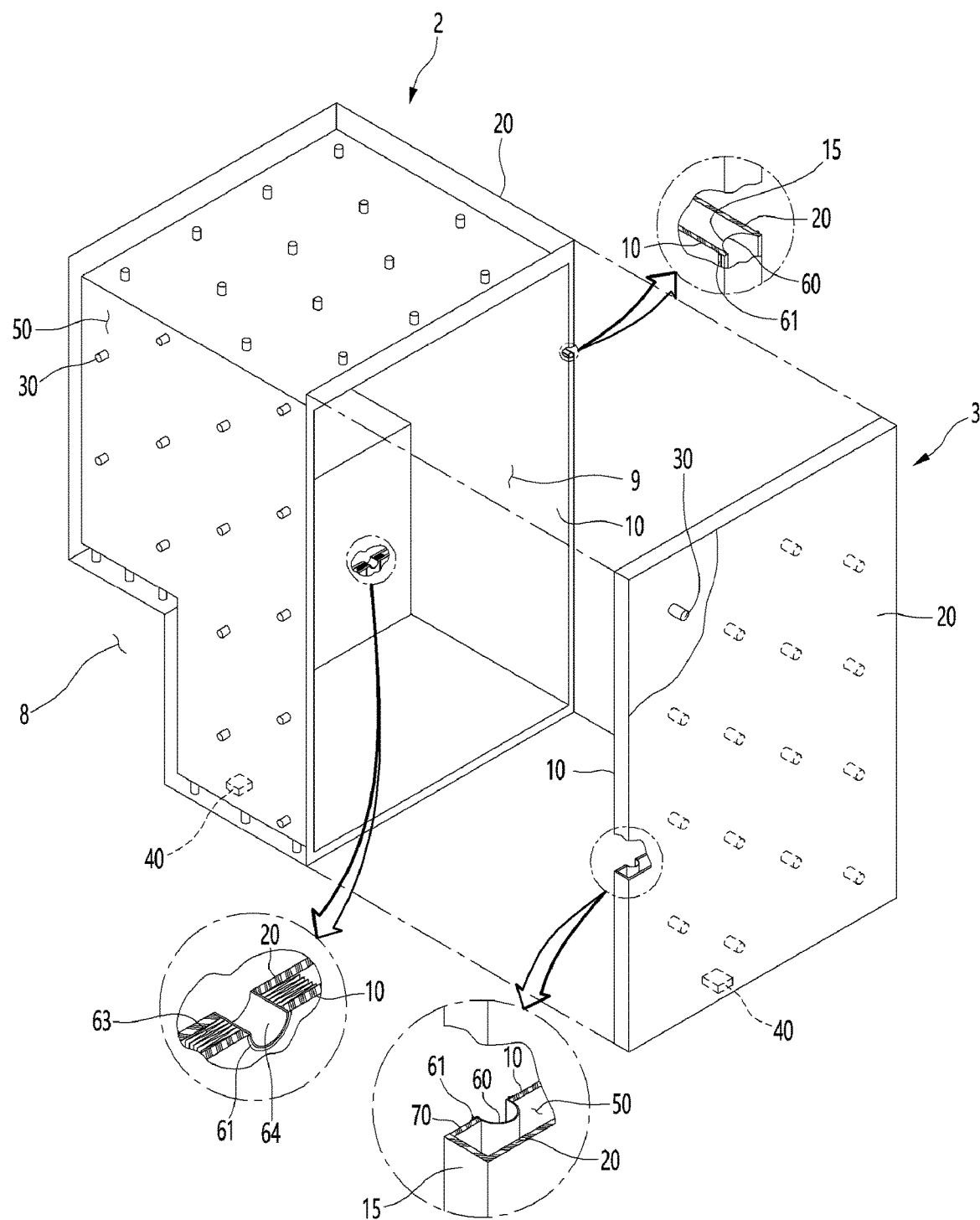
FIG. 2 is a view schematically illustrating a vacuum adiabatic body used for a body and a door of a refrigerator.

FIG. 1 is a perspective view of a refrigerator according to an embodiment, and FIG. 2 is a schematic view illustrating a vacuum adiabatic body used for a body and a door of the refrigerator. Referring to FIG. 1, the refrigerator 1 includes a main body 2 provided with a cavity 9 capable of storing storage goods and a door 3 provided to open and close the main body 2. The door 3 may be rotatably or slidably disposed to open or close the cavity 9. The cavity 9 may provide at least one of a refrigerating compartment and a freezing compartment. A cold source that supplies cold to the cavity may be provided. For example, the cold source may be an evaporator 7 that evaporates the refrigerant to take heat. The evaporator 7 may be connected to a compressor 4 that compresses the refrigerant evaporated to the cold source. The evaporator 7 may be connected to a condenser 5 that condenses the compressed refrigerant to the cold source. The evaporator 7 may be connected to an expander 6 that expands the refrigerant condensed in the cold source. A fan corresponding to the evaporator and the condenser may be provided to promote heat exchange. As another example, the cold source may be a heat absorption surface of a thermoelectric element. A heat absorption sink may be connected to the heat absorption surface of the thermoelectric element. A heat sink may be connected to a heat radiation surface of the thermoelectric element. A fan corresponding to the heat absorption surface and the heat generation surface may be provided to promote heat exchange.

Referring to FIG. 2, plates 10, 15, and 20 may be walls defining the vacuum space. The plates may be walls that partition the vacuum space from an external space of the vacuum space. An example of the plates is as follows. The present disclosure may be any one of the following examples or a combination of two or more examples.

The plate may be provided as one portion or may be provided to include at least two portions connected to each other. As a first example, the plate may include at least two portions connected to each other in a direction along a wall defining the vacuum space. Any one of the two portions may include a portion (e.g., a first portion) defining the vacuum space. The first portion may be a single portion or may include at least two portions that are sealed to each other. The other one of the two portions may include a portion (e.g., a second portion) extending from the first portion of the first plate in a direction away from the vacuum space or extending in an inner direction of the vacuum space. As a second example, the plate may include at least two layers connected to each other in a thickness direction of the plate. Any one of the two layers may include a layer (e.g., the first portion) defining the vacuum space. The other one of the two layers may include a portion (e.g., the second portion) provided in an external space (e.g., a first space and a second space) of the vacuum space. In this case, the second portion may be defined as an outer cover of the plate. The other one of the two layers may include a portion (e.g., the second portion) provided in the vacuum space. In this case, the second portion may be defined as an inner cover of the plate.

The plate may include a first plate 10 and a second plate 20. One surface of the first plate (the inner surface of the first plate) provides a wall defining the vacuum space, and the other surface (the outer surface of the first plate) of the first plate A wall defining the first space may be provided. The first space may be a space provided in the vicinity of the first plate, a space defined by the apparatus, or an internal space of the apparatus. In this case, the first plate may be referred to as an inner case. When the first plate and the additional member define the internal space, the first plate and the additional member may be referred to as an inner case. The inner case may include two or more layers. In this case, one of the plurality of layers may be referred to as an inner panel. One surface of the second plate (the inner surface of the second plate) provides a wall defining the vacuum space, and the other surface (the outer surface of the first plate) of the second plate A wall defining the second space may be provided. The second space may be a space provided in vicinity of the second plate, another space defined by the apparatus, or an external space of the apparatus. In this case, the second plate may be referred to as an outer case. When the second plate and the additional member define the external space, the second plate and the additional member may be referred to as an outer case. The outer case may include two or more layers. In this case, one of the plurality of layers may be referred to as an outer panel. The second space may be a space having a temperature higher than that of the first space or a space having a temperature lower than that of the first space. Optionally, the plate may include a side plate 15. In FIG. 2, the side plate may also perform a function of a conductive resistance sheet 60 to be described later, according to the disposition of the side plate. The side plate may include a portion extending in a height direction of a space defined between the first plate and the second plate or a portion extending in a height direction of the vacuum space. One surface of the side plate may provide a wall defining the vacuum space, and the other surface of the side plate may provide a wall defining an external space of the vacuum space. The external space of the vacuum space may be at least one of the first space or the second space or a space in which another adiabatic body to be described later is disposed. The side plate may be integrally provided by extending at least one of the first plate or the second plate or a separate component connected to at least one of the first plate or the second plate.

The plate may optionally include a curved portion. In the present disclosure, the plate including a curved portion may be referred to as a bent plate. The curved portion may include at least one of the first plate, the second plate, the side plate, between the first plate and the second plate, between the first plate and the side plate, or between the second plate and the side plate. The plate may include at least one of a first curved portion or a second curved portion, an example of which is as follows. First, the side plate may include the first curved portion. A portion of the first curved portion may include a portion connected to the first plate. Another portion of the first curved portion may include a portion connected to the second curved portion. In this case, a curvature radius of each of the first curved portion and the second curved portion may be large. The other portion of the first curved portion may be connected to an additional straight portion or an additional curved portion, which are provided between the first curved portion and the second curved portion. In this case, a curvature radius of each of the first curved portion and the second curved portion may be small. Second, the side plate may include the second curved portion. A portion of the second curved portion may include a portion connected to the second plate. The other portion of the second curved portion may include a portion connected to the first curved portion. In this case, a curvature radius of each of the first curved portion and the second curved portion may be large. The other portion of the second curved portion may be connected to an additional straight portion or an additional curved portion, which are provided between the first curved portion and the second curved portion. In this case, a curvature radius of each of the first curved portion and the second curved portion may be small. Here, the straight portion may be defined as a portion having a curvature radius greater than that of the curved portion. The straight portion may be understood as a portion having a perfect plane or a curvature radius greater than that of the curved portion. Third, the first plate may include the first curved portion. A portion of the first curved portion may include a portion connected to the side plate. A portion connected to the side plate may be provided at a position that is away from the second plate at a portion at which the first plate extends in the longitudinal direction of the vacuum space. Fourth, the second plate may include the second curved portion. A portion of the second curved portion may include a portion connected to the side plate. A portion connected to the side plate may be provided at a position that is away from the first plate at a portion at which the second plate extends in the longitudinal direction of the vacuum space. The present disclosure may include a combination of any one of the first and second examples described above and any one of the third and fourth examples described above.

In the present disclosure, the vacuum space 50 may be defined as a third space. The vacuum space may be a space in which a vacuum pressure is maintained. In the present disclosure, the expression that a vacuum degree of A is higher than that of B means that a vacuum pressure of A is lower than that of B.

In the present disclosure, the seal 61 may be a portion provided between the first plate and the second plate. Examples of sealing are as follows. The present disclosure may be any one of the following examples or a combination of two or more examples. The sealing may include fusion welding for coupling the plurality of objects by melting at least a portion of the plurality of objects. For example, the first plate and the second plate may be welded by laser welding in a state in which a melting bond such as a filler metal is not interposed therebetween, a portion of the first and second plates and a portion of the component coupling portion may be welded by high-frequency brazing or the like, or a plurality of objects may be welded by a melting bond that generates heat. The sealing may include pressure welding for coupling the plurality of objects by a mechanical pressure applied to at least a portion of the plurality of objects. For example, as a component connected to the component coupling portion, an object made of a material having a degree of deformation resistance less than that of the plate may be pressure-welded by a method such as pinch-off.

A machine room 8 may be optionally provided outside the vacuum adiabatic body. The machine room may be defined as a space in which components connected to the cold source are accommodated. Optionally, the vacuum adiabatic body may include a port 40. The port may be provided at any one side of the vacuum adiabatic body to discharge air of the vacuum space 50. Optionally, the vacuum adiabatic body may include a conduit 64 passing through the vacuum space 50 to install components connected to the first space and the second space.

FIG. 3 is a view illustrating an example of a support that maintains the vacuum space. An example of the support is as follows. The present disclosure may be any one of the following examples or a combination of two or more examples.

The supports 30, 31, 33, and 35 may be provided to support at least a portion of the plate and a heat transfer resistor to be described later, thereby reducing deformation of at least some of the vacuum space 50, the plate, and the heat transfer resistor to be described later due to external force. The external force may include at least one of a vacuum pressure or external force excluding the vacuum pressure. When the deformation occurs in a direction in which a height of the vacuum space is lower, the support may reduce an increase in at least one of radiant heat conduction, gas heat conduction, surface heat conduction, or support heat conduction, which will be described later. The support may be an object provided to maintain a gap between the first plate and the second plate or an object provided to support the heat transfer resistor. The support may have a degree of deformation resistance greater than that of the plate or be provided to a portion having weak degree of deformation resistance among portions constituting the vacuum adiabatic body, the apparatus having the vacuum adiabatic body, and the wall having the vacuum adiabatic body. According to an embodiment, a degree of deformation resistance represents a degree to which an object resists deformation due to external force applied to the object and is a value determined by a shape including a thickness of the object, a material of the object, a processing method of the object, and the like. Examples of the portions having the weak degree of deformation resistance include the vicinity of the curved portion defined by the plate, at least a portion of the curved portion, the vicinity of an opening defined in the body of the apparatus, which is provided by the plate, or at least a portion of the opening. The support may be disposed to surround at least a portion of the curved portion or the opening or may be provided to correspond to the shape of the curved portion or the opening. However, it is not excluded that the support is provided in other portions. The opening may be understood as a portion of the apparatus including the body and the door capable of opening or closing the opening defined in the body.

An example in which the support is provided to support the plate is as follows. First, at least a portion of the support may be provided in a space defined inside the plate. The plate may include a portion including a plurality of layers, and the support may be provided between the plurality of layers. Optionally, the support may be provided to be connected to at least a portion of the plurality of layers or be provided to support at least a portion of the plurality of layers. Second, at least a portion of the support may be provided to be connected to a surface defined on the outside of the plate. The support may be provided in the vacuum space or an external space of the vacuum space. For example, the plate may include a plurality of layers, and the support may be provided as any one of the plurality of layers. Optionally, the support may be provided to support the other one of the plurality of layers. For example, the plate may include a plurality of portions extending in the longitudinal direction, and the support may be provided as any one of the plurality of portions. Optionally, the support may be provided to support the other one of the plurality of parts. As further another example, the support may be provided in the vacuum space or the external space of the vacuum space as a separate component, which is distinguished from the plate. Optionally, the support may be provided to support at least a portion of a surface defined on the outside of the plate. Optionally, the support may be provided to support one surface of the first plate and one surface of the second plate, and one surface of the first plate and one surface of the second plate may be provided to face each other. Third, the support may be provided to be integrated with the plate. An example in which the support is provided to support the heat transfer resistor may be understood instead of the example in which the support is provided to support the plate. A duplicated description will be omitted.

An example of the support in which heat transfer through the support is designed to be reduced is as follows. First, at least a portion of the components disposed in the vicinity of the support may be provided so as not to be in contact with the support or provided in an empty space provided by the support. Examples of the components include a tube or component connected to the heat transfer resistor to be described later, an exhaust port, a getter port, a tube or component passing through the vacuum space, or a tube or component of which at least a portion is disposed in the vacuum space. Examples of the empty space may include an empty space provided in the support, an empty space provided between the plurality of supports, and an empty space provided between the support and a separate component that is distinguished from the support. Optionally, at least a portion of the component may be disposed in a through-hole defined in the support, be disposed between the plurality of bars, be disposed between the plurality of connection plates, or be disposed between the plurality of support plates. Optionally, at least a portion of the component may be disposed in a spaced space between the plurality bars, be disposed in a spaced space between the plurality of connection plates, or be disposed in a spaced space between the plurality of support plates. Second, the adiabatic body may be provided on at least a portion of the support or in the vicinity of at least a portion of the support. The adiabatic body may be provided to be in contact with the support or provided so as not to be in contact with the support. The adiabatic body may be provided at a portion in which the support and the plate are in contact with each other. The adiabatic body may be provided on at least a portion of one surface and the other surface of the support or be provided to cover at least a portion of one surface and the other surface of the support. The adiabatic body may be provided on at least a portion of a periphery of one surface and a periphery of the other surface of the support or be provided to cover at least a portion of a periphery of one surface and a periphery of the other surface of the support. The support may include a plurality of bars, and the adiabatic body may be disposed on an area from a point at which any one of the plurality of bars is disposed to a midpoint between the one bar and the surrounding bars. Third, when cold is transferred through the support, a heat source may be disposed at a position at which the heat adiabatic body described in the second example is disposed. When a temperature of the first space is lower than a temperature of the second space, the heat source may be disposed on the second plate or in the vicinity of the second plate. When heat is transmitted through the support, a cold source may be disposed at a position at which the heat adiabatic body described in the second example is disposed. When a temperature of the first space is higher than a temperature of the second space, the cold source may be disposed on the second plate or in the vicinity of the second plate. As fourth example, the support may include a portion having heat transfer resistance higher than a metal or a portion having heat transfer resistance higher than the plate. The support may include a portion having heat transfer resistance less than that of another adiabatic body. The support may include at least one of a non-metal material, PPS, and glass fiber (GF), low outgassing PC, PPS, or LCP. This is done for a reason in which high compressive strength, low outgassing, and a water absorption rate, low thermal conductivity, high compressive strength at a high temperature, and excellent workability are being capable of obtained.

Examples of the support may be the bars 30 and 31, the connection plate 35, the support plate 35, a porous material 33, and a filler 33. In this embodiment, the support may include any one of the above examples, or an example in which at least two examples are combined. As first example, the support may include bars 30 and 31. The bar may include a portion extending in a direction in which the first plate and the second plate are connected to each other to support a gap between the first plate and the second plate. The bar may include a portion extending in a height direction of the vacuum space and a portion extending in a direction that is substantially perpendicular to the direction in which the plate extends. The bar may be provided to support only one of the first plate and the second plate or may be provided both the first plate and the second plate. For example, one surface of the bar may be provided to support a portion of the plate, and the other surface of the bar may be provided so as not to be in contact with the other portion of the plate.

As another example, one surface of the bar may be provided to support at least a portion of the plate, and the other surface of the bar may be provided to support the other portion of the plate. The support may include a bar having an empty space therein or a plurality of bars, and an empty space are provided between the plurality of bars. In addition, the support may include a bar, and the bar may be disposed to provide an empty space between the bar and a separate component that is distinguished from the bar. The support may selectively include a connection plate 35 including a portion connected to the bar or a portion connecting the plurality of bars to each other. The connection plate may include a portion extending in the longitudinal direction of the vacuum space or a portion extending in the direction in which the plate extends. An XZ-plane cross-sectional area of the connection plate may be greater than an XZ-plane cross-sectional area of the bar. The connection plate may be provided on at least one of one surface and the other surface of the bar or may be provided between one surface and the other surface of the bar. At least one of one surface and the other surface of the bar may be a surface on which the bar supports the plate. The shape of the connection plate is not limited. The support may include a connection plate having an empty space therein or a plurality of connection plates, and an empty space are provided between the plurality of connection plates. In addition, the support may include a connection plate, and the connection plate may be disposed to provide an empty space between the connection plate and a separate component that is distinguished from the connection plate. As a second example, the support may include a support plate 35. The support plate may include a portion extending in the longitudinal direction of the vacuum space or a portion extending in the direction in which the plate extends. The support plate may be provided to support only one of the first plate and the second plate or may be provided both the first plate and the second plate. For example, one surface of the support plate may be provided to support a portion of the plate, and the other surface of the support plate may be provided so as not to be in contact with the other portion of the plate. As another example, one surface of the support plate may be provided to support at least a portion of the plate, and the other surface of the support plate may be provided to support the other portion of the plate. A cross-sectional shape of the support plate is not limited. The support may include a support plate having an empty space therein or a plurality of support plates, and an empty space are provided between the plurality of support plates. In addition, the support may include a support plate, and the support plate may be disposed to provide an empty space between the support plate and a separate component that is distinguished from the support plate. As a third example, the support may include a porous material 33 or a filler 33. The inside of the vacuum space may be supported by the porous material or the filler. The inside of the vacuum space may be completely filled by the porous material or the filler. The support may include a plurality of porous materials or a plurality of fillers, and the plurality of porous materials or the plurality of fillers may be disposed to be in contact with each other. When an empty space is provided inside the porous material, provided between the plurality of porous materials, or provided between the porous material and a separate component that is distinguished from the porous material, the porous material may be understood as including any one of the aforementioned bar, connection plate, and support plate. When an empty space is provided inside the filler, provided between the plurality of fillers, or provided between the filler and a separate component that is distinguished from the filler, the filler may be understood as including any one of the aforementioned bar, connection plate, and support plate. The support according to the present disclosure may include any one of the above examples or an example in which two or more examples are combined.

Referring to FIG. 3a, as an embodiment, the support may include a bar 31 and a connection plate and support plate 35. The connection plate and the supporting plate may be designed separately. Referring to FIG. 3b, as an embodiment, the support may include a bar 31, a connection plate and support plate 35, and a porous material 33 filled in the vacuum space. The porous material 33 may have emissivity greater than that of stainless steel, which is a material of the plate, but since the vacuum space is filled, resistance efficiency of radiant heat transfer is high. The porous material may also function as a heat transfer resistor to be described later. More preferably, the porous material may perform a function of a radiation resistance sheet to be described later. Referring to FIG. 3c, as an embodiment, the support may include a porous material 33 or a filler 33. The porous material 33 and the filler may be provided in a compressed state to maintain a gap between the vacuum space. The film 34 may be provided in a state in which a hole is punched as, for example, a PE material. The porous material 33 or the filler may perform both a function of the heat transfer resistor and a function of the support, which will be described later. More preferably, the porous material may perform both a function of the radiation resistance sheet and a function of the support to be described later.

Figure 4:
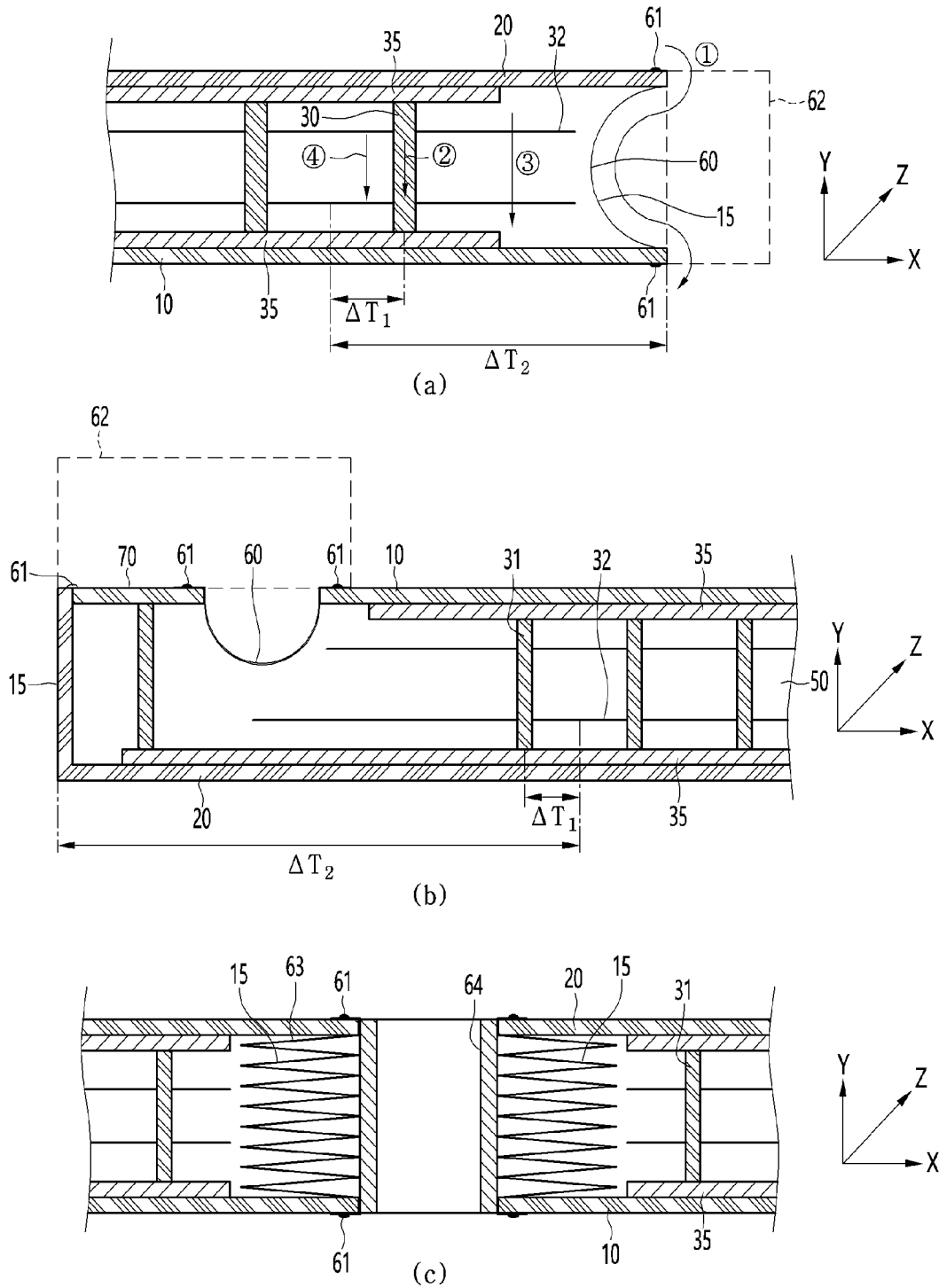
FIG. 4 is a view for explaining an embodiment of a vacuum adiabatic body centering on a heat transfer resistor.

FIG. 4 is a view for explaining an example of the vacuum adiabatic body based on heat transfer resistors 32, 33, 60, and 63 (e.g., thermal insulator and a heat transfer resistance body). The vacuum adiabatic body according to the present disclosure may optionally include a heat transfer resistor. An example of the heat transfer resistor is as follows. The present disclosure may be any one of the following examples or a combination of two or more examples.

The heat transfer resistors 32, 33, 60, and 63 may be objects that reduce an amount of heat transfer between the first space and the second space or objects that reduce an amount of heat transfer between the first plate and the second plate. The heat transfer resistor may be disposed on a heat transfer path defined between the first space and the second space or be disposed on a heat transfer path formed between the first plate and the second plate. The heat transfer resistor may include a portion extending in a direction along a wall defining the vacuum space or a portion extending in a direction in which the plate extends. Optionally, the heat transfer resistor may include a portion extending from the plate in a direction away from the vacuum space. The heat transfer resistor may be provided on at least a portion of the periphery of the first plate or the periphery of the second plate or be provided on at least a portion of an edge of the first plate or an edge of the second plate. The heat transfer resistor may be provided at a portion, in which the through-hole is defined, or provided as a tube connected to the through-hole. A separate tube or a separate component that is distinguished from the tube may be disposed inside the tube. The heat transfer resistor may include a portion having heat transfer resistance greater than that of the plate. In this case, adiabatic performance of the vacuum adiabatic body may be further improved. A shield 62 may be provided on the outside of the heat transfer resistor to be insulated. The inside of the heat transfer resistor may be insulated by the vacuum space. The shield may be provided as a porous material or a filler that is in contact with the inside of the heat transfer resistor. The shield may be an adiabatic structure that is exemplified by a separate gasket placed outside the inside of the heat transfer resistor. The heat transfer resistor may be a wall defining the third space.

An example in which the heat transfer resistor is connected to the plate may be understood as replacing the support with the heat transfer resistor in an example in which the support is provided to support the plate. A duplicate description will be omitted. The example in which the heat transfer resistor is connected to the support may be understood as replacing the plate with the support in the example in which the heat transfer resistor is connected to the plate. A duplicate description will be omitted. The example of reducing heat transfer via the heat transfer body may be applied as a substitute the example of reducing the heat transfer via the support, and thus, the same explanation will be omitted.

In the present disclosure, the heat transfer resistor may be one of a radiation resistance sheet 32, a porous material 33, a filler 33, and a conductive resistance sheet. In the present disclosure, the heat transfer resistor may include a combination of at least two of the radiation resistance sheet 32, the porous material 33, the filler 33, and the conductive resistance sheet. As a first example, the heat transfer resistor may include a radiation resistance sheet 32. The radiation resistance sheet may include a portion having heat transfer resistance greater than that of the plate, and the heat transfer resistance may be a degree of resistance to heat transfer by radiation. The support may perform a function of the radiation resistance sheet together. A conductive resistance sheet to be described later may perform the function of the radiation resistance sheet together. As a second example, the heat transfer resistor may include conduction resistance sheets 60 and 63. The conductive resistance sheet may include a portion having heat transfer resistance greater than that of the plate, and the heat transfer resistance may be a degree of resistance to heat transfer by conduction. For example, the conductive resistance sheet may have a thickness less than that of at least a portion of the plate. As another example, the conductive resistance sheet may include one end and the other end, and a length of the conductive resistance sheet may be longer than a straight distance connecting one end of the conductive resistance sheet to the other end of the conductive resistance sheet. As another example, the conductive resistance sheet may include a material having resistance to heat transfer greater than that of the plate by conduction. As another example, the heat transfer resistor may include a portion having a curvature radius less than that of the plate.

Referring to FIG. 4a, for example, a conductive resistance sheet may be provided on a side plate connecting the first plate to the second plate. Referring to FIG. 4b, for example, a conductive resistance sheet 60 may be provided on at least a portion of the first plate and the second plate. A connection frame 70 may be further provided outside the conductive resistance sheet. The connection frame may be a portion from which the first plate or the second plate extends or a portion from which the side plate extends. Optionally, the connection frame 70 may include a portion at which a component for sealing the door and the body and a component disposed outside the vacuum space such as the exhaust port and the getter port, which are required for the exhaust process, are connected to each other. Referring to FIG. 4c, for example, a conductive resistance sheet may be provided on a side plate connecting the first plate to the second plate. The conductive resistance sheet may be installed in a through-hole passing through the vacuum space. The conduit 64 may be provided separately outside the conductive resistance sheet. The conductive resistance sheet may be provided in a pleated shape. Through this, the heat transfer path may be lengthened, and deformation due to a pressure difference may be prevented. A separate shielding member for insulating the conductive resistance sheet 63 may also be provided. The conductive resistance sheet may include a portion having a degree of deformation resistance less than that of at least one of the plate, the radiation resistance sheet, or the support. The radiation resistance sheet may include a portion having a degree of deformation resistance less than that of at least one of the plate or the support. The plate may include a portion having a degree of deformation resistance less than that of the support. The conductive resistance sheet may include a portion having conductive heat transfer resistance greater than that of at least one of the plate, the radiation resistance sheet, or the support. The radiation resistance sheet may include a portion having radiation heat transfer resistance greater than that of at least one of the plate, the conductive resistance sheet, or the support. The support may include a portion having heat transfer resistance greater than that of the plate. For example, at least one of the plate, the conductive resistance sheet, or the connection frame may include stainless steel material, the radiation resistance sheet may include aluminum, and the support may include a resin material.

FIG. 5 is a graph for observing a process of exhausting the inside of the vacuum adiabatic body with a time and pressure when the support is used. An example of a vacuum adiabatic body vacuum exhaust process vacuum is as follows. The present disclosure may be any one of the following examples or a combination of two or more examples.

While the exhaust process is being performed, an outgassing process, which is a process in which a gas of the vacuum space is discharged, or a potential gas remaining in the components of the vacuum adiabatic body is discharged, may be performed. As an example of the outgassing process, the exhaust process may include at least one of heating or drying the vacuum adiabatic body, providing a vacuum pressure to the vacuum adiabatic body, or providing a getter to the vacuum adiabatic body. In this case, it is possible to promote the vaporization and exhaust of the potential gas remaining in the component provided in the vacuum space. The exhaust process may include a process of cooling the vacuum adiabatic body. The cooling process may be performed after the process of heating or drying the vacuum adiabatic body is performed. The process of heating or drying the vacuum adiabatic body process of providing the vacuum pressure to the vacuum adiabatic body may be performed together. The process of heating or drying the vacuum adiabatic body and the process of providing the getter to the vacuum adiabatic body may be performed together. After the process of heating or drying the vacuum adiabatic body is performed, the process of cooling the vacuum adiabatic body may be performed. The process of providing the vacuum pressure to the vacuum adiabatic body and the process of providing the getter to the vacuum adiabatic body may be performed so as not to overlap each other. For example, after the process of providing the vacuum pressure to the vacuum adiabatic body is performed, the process of providing the getter to the vacuum adiabatic body may be performed. When the vacuum pressure is provided to the vacuum adiabatic body, a pressure of the vacuum space may drop to a certain level and then no longer drop. Here, after stopping the process of providing the vacuum pressure to the vacuum adiabatic body, the getter may be input. As an example of stopping the process of providing the vacuum pressure to the vacuum adiabatic body, an operation of a vacuum pump connected to the vacuum space may be stopped. When inputting the getter, the process of heating or drying the vacuum adiabatic body may be performed together. Through this, the outgassing may be promoted. As another example, after the process of providing the getter to the vacuum adiabatic body is performed, the process of providing the vacuum pressure to the vacuum adiabatic body may be performed.

The time during which the vacuum adiabatic body vacuum exhaust process is performed may be referred to as a vacuum exhaust time. The vacuum exhaust time includes at least one of a time $\Delta t1$ during which the process of heating or drying the vacuum adiabatic body is performed, a time $\Delta t2$ during which the process of maintaining the getter in the vacuum adiabatic body is performed, of a time $\Delta t3$ during which the process of cooling the vacuum adiabatic body is performed. Examples of times $\Delta t1$, $\Delta t2$, and $\Delta t3$ are as follows. The present disclosure may be any one of the following examples or a combination of two or more examples. In the vacuum adiabatic body vacuum exhaust process, the time $\Delta t1$ may be a time $\Delta t1a$ or more and a time $t1b$ or less. As a first example, the time $t1a$ may be greater than or equal to about 0.2 hr and less than or equal to about 0.5 hr. The time $t1b$ may be greater than or equal to about 1 hr and less than or equal to about 24.0 hr. The time $\Delta t1$ may be about 0.3 hr or more and about 12.0 hr or less. The time $\Delta t1$ may be about 0.4 hr or more and about 8.0 hr or less. The time $\Delta t1$ may be about 0.5 hr or more and about 4.0 hr or less. In this case, even if the $\Delta t1$ is kept as short as possible, the sufficient outgassing may be applied to the vacuum adiabatic body. For example, this case may include a case in which a component of the vacuum adiabatic body, which is exposed to the vacuum space, among the components of the vacuum adiabatic body, has an outgassing rate (%) less than that of any one of the component of the vacuum adiabatic body, which is exposed to the external space of the vacuum space. Specifically, the component exposed to the vacuum space may include a portion having a outgassing rate less than that of a thermoplastic polymer. More specifically, the support or the radiation resistance sheet may be disposed in the vacuum space, and the outgassing rate of the support may be less than that of the thermoplastic plastic. As another example, this case may include a case in which a component of the vacuum adiabatic body, which is exposed to the vacuum space, among the components of the vacuum adiabatic body, has a max operating temperature (° C.) greater than that of any one of the component of the vacuum adiabatic body, which is exposed to the external space of the vacuum space. In this case, the vacuum adiabatic body may be heated to a higher temperature to increase in outgassing rate. For example, the component exposed to the vacuum space may include a portion having an operating temperature greater than that of the thermoplastic polymer. As a more specific example, the support or the radiation resistance sheet may be disposed in the vacuum space, and a use temperature of the support may be higher than that of the thermoplastic plastic. As another example, among the components of the vacuum adiabatic body, the component exposed to the vacuum space may contain more metallic portion than a non-metallic portion. That is, a mass of the metallic portion may be greater than a mass of the non-metallic portion, a volume of the metallic portion may be greater than a volume of the non-metallic portion, or an area of the metallic portion exposed to the vacuum space may be greater than an area exposed to the non-metallic portion of the vacuum space. When the components exposed to the vacuum space are provided in plurality, the sum of the volume of the metal material included in the first component and the volume of the metal material included in the second component may be greater than that of the volume of the non-metal material included in the first component and the volume of the non-metal material included in the second component. When the components exposed to the vacuum space are provided in plurality, the sum of the mass of the metal material included in the first component and the mass of the metal material included in the second component may be greater than that of the mass of the non-metal material included in the first component and the mass of the non-metal material included in the second component. When the components exposed to the vacuum space are provided in plurality, the sum of the area of the metal material, which is exposed to the vacuum space and included in the first component, and an area of the metal material, which is exposed to the vacuum space and included in the second component, may be greater than that of the area of the non-metal material, which is exposed to the vacuum space and included in the first component, and an area of the non-metal material, which is exposed to the vacuum space and included in the second component. As a second example, the time $t1a$ may be greater than or equal to about 0.5 hr and less than or equal to about 1 hr. The time $t1b$ may be greater than or equal to about 24.0 hr and less than or equal to about 65 hr. The time $\Delta t1$ may be about 1.0 hr or more and about 48.0 hr or less. The time $\Delta t1$ may be about 2 hr or more and about 24.0 hr or less. The time $\Delta t1$ may be about 3 hr or more and about 12.0 hr or less. In this case, it may be the vacuum adiabatic body that needs to maintain the $\Delta t1$ as long as possible. In this case, a case opposite to the examples described in the first example or a case in which the component exposed to the vacuum space is made of a thermoplastic material may be an example. A duplicated description will be omitted. In the vacuum adiabatic body vacuum exhaust process, the time $\Delta t1$ may be a time $t1a$ or more and a time $t1b$ or less. The time $t2a$ may be greater than or equal to about 0.1 hr and less than or equal to about 0.3 hr. The time $t2b$ may be greater than or equal to about 1 hr and less than or equal to about 5.0 hr. The time $\Delta t2$ may be about 0.2 hr or more and about 3.0 hr or less. The time $\Delta t2$ may be about 0.3 hr or more and about 2.0 hr or less. The time $\Delta t2$ may be about 0.5 hr or more and about 1.5 hr or less. In this case, even if the time $\Delta t2$ is kept as short as possible, the sufficient outgassing through the getter may be applied to the vacuum adiabatic body. In the vacuum adiabatic body vacuum exhaust process, the time $\Delta t3$ may be a time $t3a$ or more and a time $t3b$ or less. The time $t2a$ may be greater than or equal to about 0.2 hr and less than or equal to about 0.8 hr. The time $t2b$ may be greater than or equal to about 1 hr and less than or equal to about 65.0 hr. The time $\Delta t3$ may be about 0.2 hr or more and about 48.0 hr or less. The time $\Delta t3$ may be about 0.3 hr or more and about 24.0 hr or less. The time $\Delta t3$ may be about 0.4 hr or more and about 12.0 hr or less. The time $\Delta t3$ may be about 0.5 hr or more and about 5.0 hr or less. After the heating or drying process is performed during the exhaust process, the cooling process may be performed. For example, when the heating or drying process is performed for a long time, the time $\Delta t3$ may be long. The vacuum adiabatic body according to the present disclosure may be manufactured so that the time $\Delta t1$ is greater than the time $\Delta t2$, the time $\Delta t1$ is less than or equal to the time $\Delta t3$, or the time $\Delta t3$ is greater than the time $\Delta t2$. The following relational expression is satisfied: $\Delta t2 < \Delta t1 < \Delta t3$. The vacuum adiabatic body according to an embodiment may be manufactured so that the relational expression: $\Delta t1 + \Delta t2 + \Delta t3$ may be greater than or equal to about 0.3 hr and less than or equal to about 70 hr, be greater than or equal to about 1 hr and less than or equal to about 65 hr, or be greater than or equal to about 2 hr and less than or equal to about 24 hr. The relational expression: $\Delta t1+\Delta t2+\Delta t3$ may be manufactured to be greater than or equal to about 3 hr and less than or equal to about 6 hr.

An example of the vacuum pressure condition during the exhaust process is as follows. The present disclosure may be any one of the following examples or a combination of two or more examples. A minimum value of the vacuum pressure in the vacuum space during the exhaust process may be greater than about 1.8E−6 Torr. The minimum value of the vacuum pressure may be greater than about 1.8E−6 Torr and less than or equal to about 1.0E−4 Torr, be greater than about 0.5E−6 Torr and less than or equal to about 1.0E−4 Torr, or be greater than about 0.5E−6 Torr and less than or equal to about 0.5E−5 Torr. The minimum value of the vacuum pressure may be greater than about 0.5E−6 Torr and less than about 1.0E−5 Torr. As such, the limitation in which the minimum value of the vacuum pressure provided during the exhaust process is because, even if the pressure is reduced through the vacuum pump during the exhaust process, the decrease in vacuum pressure is slowed below a certain level. As an embodiment, after the exhaust process is performed, the vacuum pressure of the vacuum space may be maintained at a pressure greater than or equal to about 1.0E−5 Torr and less than or equal to about 5.0E−1 Torr. The maintained vacuum pressure may be greater than or equal to about 1.0E−5 Torr and less than or equal to about 1.0E−1 Torr, be greater than or equal to about 1.0E−5 Torr and less than or equal to about 1.0E−2 Torr, be greater than or equal to about 1.0E−4 Torr and less than or equal to about 1.0E−2 Torr, or be greater than or equal to about 1.0E−5 Torr and less than or equal to about 1.0E−3 Torr. As a result of predicting the change in vacuum pressure with an accelerated experiment of two example products, one product may be provided so that the vacuum pressure is maintained below about 1.0E−04 Torr even after about 16.3 years, and the other product may be provided so that the vacuum pressure is maintained below about 1.0E−04 Torr even after about 17.8 years. As described above, the vacuum pressure of the vacuum adiabatic body may be used industrially only when it is maintained below a predetermined level even if there is a change over time.

FIG. 5a is a graph of an elapsing time and pressure in the exhaust process according to an example, and FIG. 5b is a view explaining results of a vacuum maintenance test in the acceleration experiment of the vacuum adiabatic body of the refrigerator having an internal volume of about 128 liters. Referring to FIG. 5b, it is seen that the vacuum pressure gradually increases according to the aging. For example, it is confirmed that the vacuum pressure is about 6.7E−04 Torr after about 4.7 years, about 1.7E−03 Torr after about 10 years, and about 1.0E−02 Torr after about 59 years. According to these experimental results, it is confirmed that the vacuum adiabatic body according to the embodiment is sufficiently industrially applicable.

Figure 6:
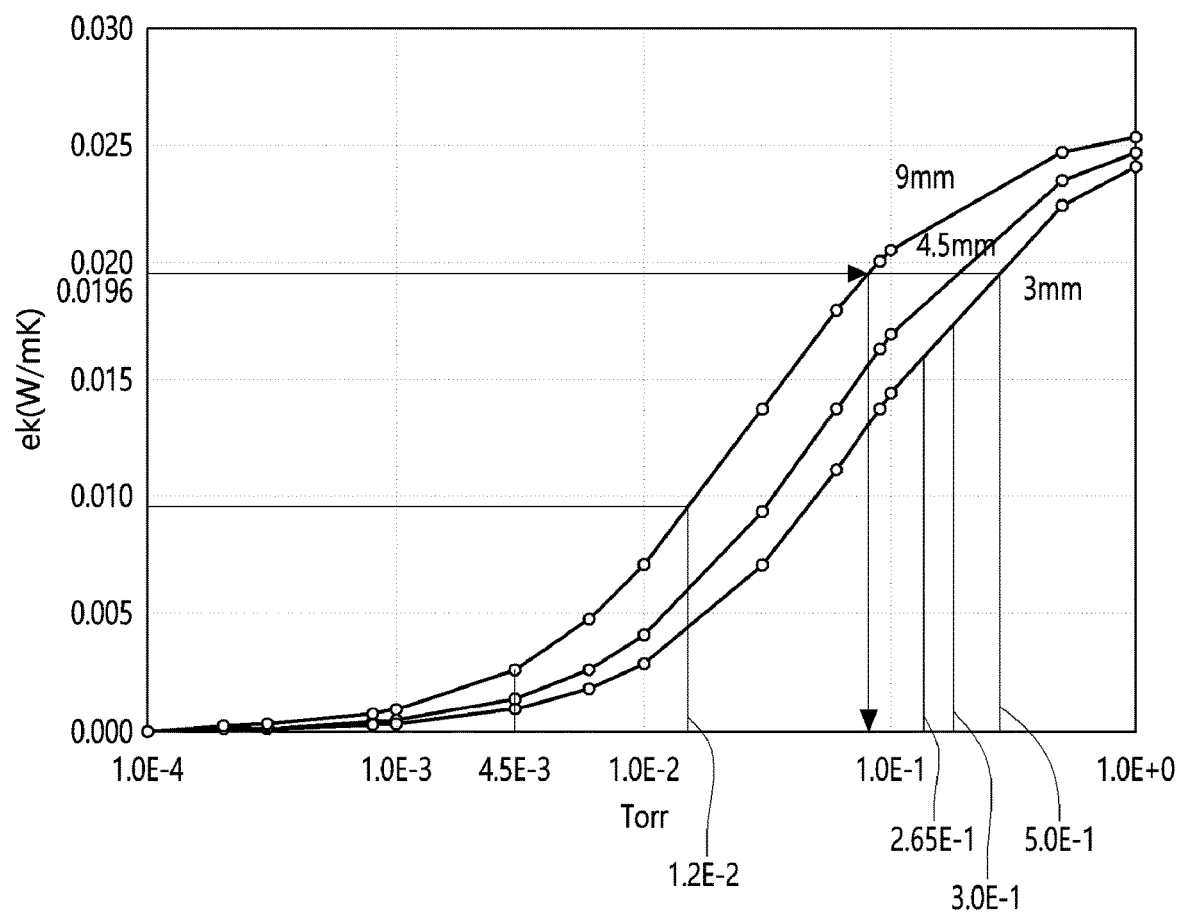
FIG. 6 is a graph comparing vacuum pressure and gas conductivity.

FIG. 6 is a graph illustrating results obtained by comparing the vacuum pressure with gas conductivity. Referring to FIG. 6, gas conductivity with respect to the vacuum pressure depending on a size of the gap in the vacuum space 50 was represented as a graph of effective heat transfer coefficient (eK). The effective heat transfer coefficient (eK) was measured when the gap in the vacuum space 50 has three values of about 3 mm, about 4.5 mm, and about 9 mm. The gap in the vacuum space 50 is defined as follows. When the radiation resistance sheet 32 exists inside surface vacuum space 50, the gap is a distance between the radiation resistance sheet 32 and the plate adjacent thereto. When the radiation resistance sheet 32 does not exist inside surface vacuum space 50, the gap is a distance between the first and second plates. It was seen that, since the size of the gap is small at a point corresponding to a typical effective heat transfer coefficient of about 0.0196 W/mK, which is provided to an adiabatic material formed by foaming polyurethane, the vacuum pressure is about 5.0E−1 Torr even when the size of the gap is about 3 mm. Meanwhile, it was seen that the point at which reduction in adiabatic effect caused by the gas conduction heat is saturated even though the vacuum pressure decreases is a point at which the vacuum pressure is approximately 4.5E−3 Torr. The vacuum pressure of about 4.5E−3 Torr may be defined as the point at which the reduction in adiabatic effect caused by the gas conduction heat is saturated. Also, when the effective heat transfer coefficient is about 0.01 W/mK, the vacuum pressure is about 1.2E−2 Torr. An example of a range of the vacuum pressure in the vacuum space according to the gap is presented. The support may include at least one of a bar, a connection plate, or a support plate. In this case, when the gap of the vacuum space is greater than or equal to about 3 mm, the vacuum pressure may be greater than or equal to A and less than about 5E−1 Torr, or be greater than about 2.65E−1 Torr and less than about 5E−1 Torr. As another example, the support may include at least one of a bar, a connection plate, or a support plate. In this case, when the gap of the vacuum space is greater than or equal to about 4.5 mm, the vacuum pressure may be greater than or equal to A and less than about 3E−1 Torr, or be greater than about 1.2E−2 Torr and less than about 5E−1 Torr. As another example, the support may include at least one of a bar, a connection plate, or a support plate, and when the gap of the vacuum space is greater than or equal to about 9 mm, the vacuum pressure may be greater than or equal to A and less than about $1.0 \times 10^{\wedge}-1$ Torr or be greater than about 4.5E−3 Torr and less than about 5E−1 Torr. Here, the A may be greater than or equal to about $1.0 \times 10^{\wedge}-6$ Torr and less than or equal to about 1.0E−5 Torr. The A may be greater than or equal to about $1.0 \times 10^{\wedge}-5$ Torr and less than or equal to about 1.0E−4 Torr. When the support includes a porous material or a filler, the vacuum pressure may be greater than or equal to about 4.7E−2 Torr and less than or equal to about 5E−1 Torr. In this case, it is understood that the size of the gap ranges from several micrometers to several hundreds of micrometers. When the support and the porous material are provided together in the vacuum space, a vacuum pressure may be created and used, which is middle between the vacuum pressure when only the support is used and the vacuum pressure when only the porous material is used.

Figure 7:
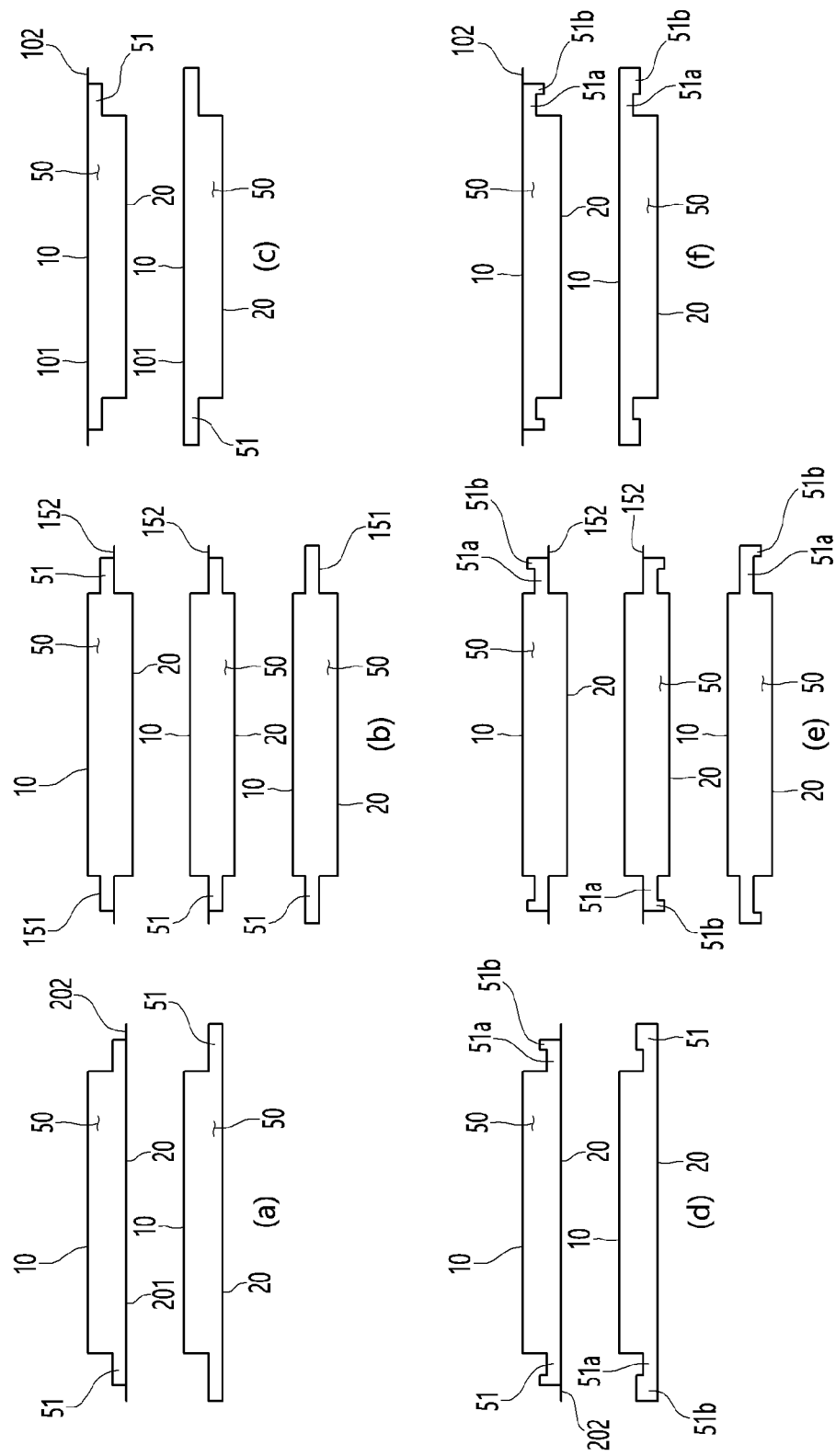
FIG. 7 is a view illustrating various embodiments of a vacuum space.

FIG. 7 is a view illustrating various examples of the vacuum space. The present disclosure may be any one of the following examples or a combination of two or more examples.

Referring to FIG. 7, the vacuum adiabatic body according to the present disclosure may include a vacuum space. The vacuum space 50 may include a first vacuum space extending in a first direction (e.g., X-axis) and having a predetermined height. The vacuum space 50 may optionally include a second vacuum space (hereinafter, referred to as a vacuum space expansion portion) different from the first vacuum space in at least one of the height or the direction. The vacuum space expansion portion may be provided by allowing at least one of the first and second plates or the side plate to extend. In this case, the heat transfer resistance may increase by lengthening a heat conduction path along the plate. The vacuum space expansion portion in which the second plate extends may reinforce adiabatic performance of a front portion of the vacuum adiabatic body. The vacuum space expansion portion in which the second plate extends may reinforce adiabatic performance of a rear portion of the vacuum adiabatic body, and the vacuum space expansion portion in which the side plate extends may reinforce adiabatic performance of a side portion of the vacuum adiabatic body. Referring to FIG. 7a, the second plate may extend to provide the vacuum space expansion portion 51. The second plate may include a second portion 202 extending from a first portion 201 defining the vacuum space 50 and the vacuum space expansion portion 51. The second portion 202 of the second plate may branch a heat conduction path along the second plate to increase in heat transfer resistance. Referring to FIG. 7b, the side plate may extend to provide the vacuum space expansion portion. The side plate may include a second portion 152 extending from a first portion 151 defining the vacuum space 50 and the vacuum space extension portion 51. The second portion of the side plate may branch the heat conduction path along the side plate to improve the adiabatic performance. The first and second portions 151 and 152 of the side plate may branch the heat conduction path to increase in heat transfer resistance. Referring to FIG. 7c, the first plate may extend to provide the vacuum space expansion portion. The first plate may include a second portion 102 extending from the first portion 101 defining the vacuum space 50 and the vacuum space expansion portion 51. The second portion of the first plate may branch the heat conduction path along the second plate to increase in heat transfer resistance. Referring to FIG. 7d, the vacuum space expansion portion 51 may include an X-direction expansion portion 51a and a Y-direction expansion portion 51b of the vacuum space. The vacuum space expansion portion 51 may extend in a plurality of directions of the vacuum space 50. Thus, the adiabatic performance may be reinforced in multiple directions and may increase by lengthening the heat conduction path in the plurality of directions to improve the heat transfer resistance. The vacuum space expansion portion extending in the plurality of directions may further improve the adiabatic performance by branching the heat conduction path. Referring to FIG. 7e, the side plate may provide the vacuum space extension portion extending in the plurality of directions. The vacuum space expansion portion may reinforce the adiabatic performance of the side portion of the vacuum adiabatic body. Referring to FIG. 7f, the first plate may provide the vacuum space extension portion extending in the plurality of directions. The vacuum space expansion portion may reinforce the adiabatic performance of the side portion of the vacuum adiabatic body.

Figure 8:
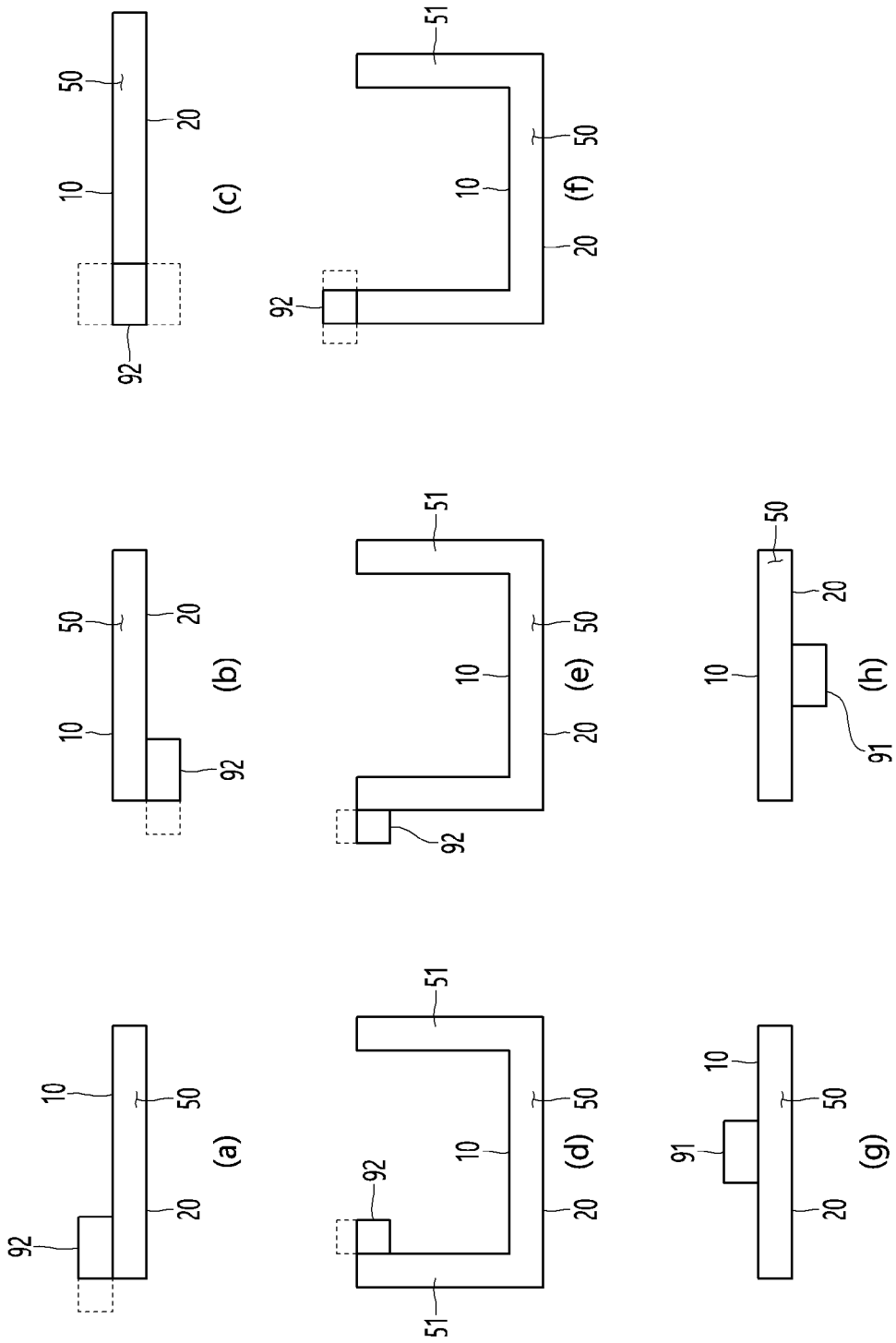
FIG. 8 is a view for explaining an additional adiabatic body.

FIG. 8 is a view for explaining another adiabatic body. The present disclosure may be any one of the following examples or a combination of two or more examples. Referring to FIG. 8, the vacuum adiabatic body according to the present disclosure may optionally include another adiabatic body 90. Another adiabatic body may have a degree of vacuum less than that of the vacuum adiabatic body and be an object that does not include a portion having a vacuum state therein. The vacuum adiabatic body and another vacuum adiabatic body may be directly connected to each other or connected to each other through an intermedium. In this case, the intermedium may have a degree of vacuum less than that of at least one of the vacuum adiabatic body or another adiabatic body or may be an object that does not include a portion having the vacuum state therein. When the vacuum adiabatic body includes a portion in which the height of the vacuum adiabatic body is high and a portion in which the height of the vacuum adiabatic body is low, another adiabatic body may be disposed at a portion having the low height of the vacuum adiabatic body. Another adiabatic body may include a portion connected to at least a portion of the first and second plates and the side plate. Another adiabatic body may be supported on the plate or coupled or sealed. A degree of sealing between another adiabatic body and the plate may be lower than a degree of sealing between the plates. Another adiabatic body may include a cured adiabatic body (e.g., PU foaming solution) that is cured after being injected, a pre-molded resin, a peripheral adiabatic body, and a side panel. At least a portion of the plate may be provided to be disposed inside another adiabatic body. Another adiabatic body may include an empty space. The plate may be provided to be accommodated in the empty space. At least a portion of the plate may be provided to cover at least a portion of another adiabatic body. Another adiabatic body may include a member covering an outer surface thereof. The member may be at least a portion of the plate. Another adiabatic body may be an intermedium for connecting, supporting, bonding, or sealing the vacuum adiabatic body to the component. Another adiabatic body may be an intermedium for connecting, supporting, bonding, or sealing the vacuum adiabatic body to another vacuum adiabatic body. Another adiabatic body may include a portion connected to a component coupling portion provided on at least a portion of the plate. Another adiabatic body may include a portion connected to a cover covering another adiabatic body. The cover may be disposed between the first plate and the first space, between the second plate and the second space, or between the side plate and a space other than the vacuum space 50. For example, the cover may include a portion on which the component is mounted. As another example, the cover may include a portion that defines an outer appearance of another adiabatic body. Referring to FIGS. 8a to 8f, another adiabatic body may include a peripheral adiabatic body. The peripheral adiabatic body may be disposed on at least a portion of a periphery of the vacuum adiabatic body, a periphery of the first plate, a periphery of the second plate, and the side plate. The peripheral adiabatic body disposed on the periphery of the first plate or the periphery of the second plate may extend to a portion at which the side plate is disposed or may extend to the outside of the side plate. The peripheral adiabatic body disposed on the side plate may extend to a portion at which the first plate or may extend to the outside of the first plate or the second plate. Referring to FIGS. 8g to 8h, another adiabatic body may include a central adiabatic body. The central adiabatic body may be disposed on at least a portion of a central portion of the vacuum adiabatic body, a central portion of the first plate, or a central portion of the second plate.

Referring to FIG. 8a, the peripheral adiabatic body 92 may be placed on the periphery of the first plate. The peripheral adiabatic body may be in contact with the first plate. The peripheral adiabatic body may be separated from the first plate or further extend from the first plate (indicated by dotted lines). The peripheral adiabatic body may improve the adiabatic performance of the periphery of the first plate. Referring to FIG. 8b, the peripheral adiabatic body may be placed on the periphery of the second plate. The peripheral adiabatic body may be in contact with the second plate. The peripheral adiabatic body may be separated from the second plate or further extend from the second plate (indicated by dotted lines). The periphery adiabatic body may improve the adiabatic performance of the periphery of the second plate.

Referring to FIG. 8c, the peripheral adiabatic body may be disposed on the periphery of the side plate. The peripheral adiabatic body may be in contact with the side plate. The peripheral adiabatic body may be separated from the side plate or further extend from the side plate. The peripheral adiabatic body may improve the adiabatic performance of the periphery of the side plate Referring to FIG. 8d, the peripheral adiabatic body 92 may be disposed on the periphery of the first plate. The peripheral adiabatic body may be placed on the periphery of the first plate constituting the vacuum space expansion portion 51. The peripheral adiabatic body may be in contact with the first plate constituting the vacuum space extension portion. The peripheral adiabatic body may be separated from or further extend to the first plate constituting the vacuum space extension portion. The peripheral adiabatic body may improve the adiabatic performance of the periphery of the first plate constituting the vacuum space expansion portion. Referring to FIGS. 8e and 8f, in the peripheral adiabatic body, the vacuum space extension portion may be disposed on a periphery of the second plate or the side plate. The same explanation as in FIG. 8d may be applied. Referring to FIG. 8g, the central adiabatic body 91 may be placed on a central portion of the first plate. The central adiabatic body may improve adiabatic performance of the central portion of the first plate. Referring to FIG. 8h, the central adiabatic body may be disposed on the central portion of the second plate. The central adiabatic body may improve adiabatic performance of the central portion of the second plate.

Figure 9:
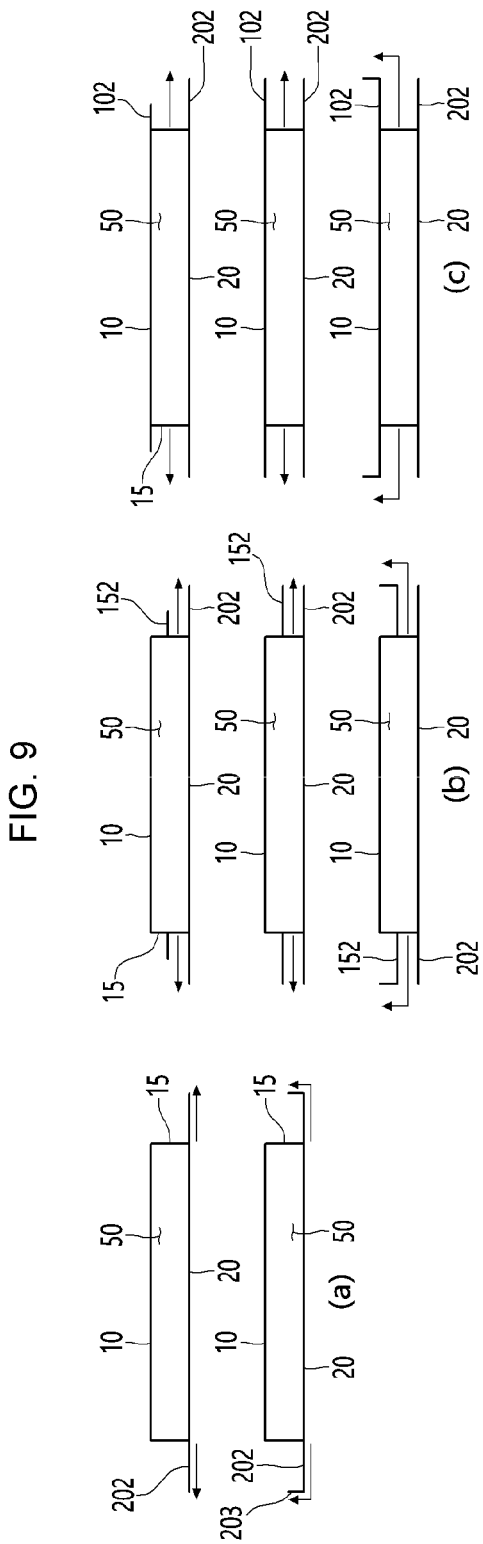
FIG. 9 is a view for explaining a heat transfer path between first and second plates having different temperatures.

FIG. 9 is a view for explaining a heat transfer path between first and second plates having different temperatures. An example of the heat transfer path is as follows. The present disclosure may be any one of the following examples or a combination of two or more examples.

The heat transfer path may pass through the extension portion at at least a portion of the first portion 101 of the first plate, the first portion 201 of the second plate, or the first portion 151 of the side plate. The first portion may include a portion defining the vacuum space. The extension portions 102, 152, and 202 may include portions extending in a direction away from the first portion. The extension portion may include a side portion of the vacuum adiabatic body, a side portion of the plate having a higher temperature among the first and second plates, or a portion extending toward the side portion of the vacuum space 50. The extension portion may include a front portion of the vacuum adiabatic body, a front portion of the plate having a higher temperature among the first and second plates, or a front portion extending in a direction away from the front portion of the vacuum space 50. Through this, it is possible to reduce generation of dew on the front portion. The vacuum adiabatic body or the vacuum space 50 may include first and second surfaces having different temperatures from each other. The temperature of the first surface may be lower than that of the second surface. For example, the first surface may be the first plate, and the second surface may be the second plate. The extension portion may extend in a direction away from the second surface or include a portion extending toward the first surface. The extension portion may include a portion, which is in contact with the second surface, or a portion extending in a state of being in contact with the second surface. The extension portion may include a portion extending to be spaced apart from the two surfaces. The extension portion may include a portion having heat transfer resistance greater than that of at least a portion of the plate or the first surface. The extension portion may include a plurality of portions extending in different directions. For example, the extension portion may include a second portion 202 of the second plate and a third portion 203 of the second plate. The third portion may also be provided on the first plate or the side plate. Through this, it is possible to increase in heat transfer resistance by lengthening the heat transfer path. In the extension portion, the above-described heat transfer resistor may be disposed. Another adiabatic body may be disposed outside the extending portion. Through this, the extension portion may reduce generation of dew on the second surface. Referring to FIG. 9a, the second plate may include the extension portion extending to the periphery of the second plate. Here, the extension portion may further include a portion extending backward. Referring to FIG. 9b, the side plate may include the extension portion extending to a periphery of the side plate. Here, the extension portion may be provided to have a length that is less than or equal to that of the extension portion of the second plate. Here, the extension portion may further include a portion extending backward. Referring to FIG. 9c, the first plate may include the extension portion extending to the periphery of the first plate. Here, the extension portion may extend to a length that is less than or equal to that of the extension portion of the second plate. Here, the extension portion may further include a portion extending backward.

Figure 10:
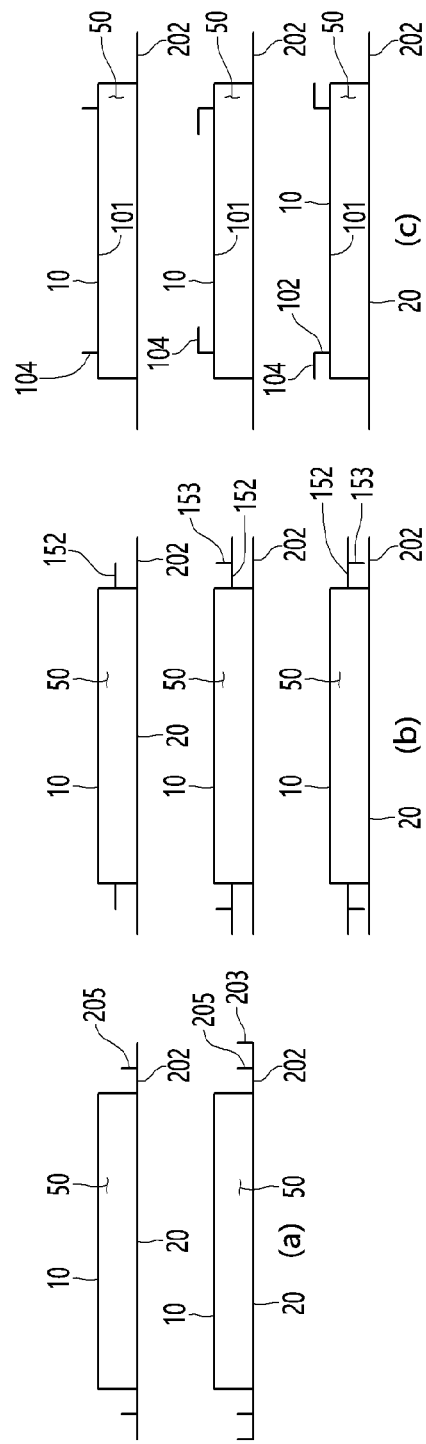
FIG. 10 is a view for explaining a branch portion on a heat transfer path between first and second plates having different temperatures.

FIG. 10 is a view for explaining a branch portion on the heat transfer path between first and second plates having different temperatures. An example of the branch portion is as follows. The present disclosure may be any one of the following examples or a combination of two or more examples.

Optionally, the heat transfer path may pass through portions 205, 153, and 104, each of which is branched from at least a portion of the first plate, the second plate, or the side plate. Here, the branched heat transfer path means a heat transfer path through which heat flows to be separated in a different direction from the heat transfer path through which heat flows along the plate. The branched portion may be disposed in a direction away from the vacuum space 50. The branched portion may be disposed in a direction toward the inside of the vacuum space 50. The branched portion may perform the same function as the extension portion described with reference to FIG. 9, and thus, a description of the same portion will be omitted. Referring to FIG. 10a, the second plate may include the branched portion 205. The branched portion may be provided in plurality, which are spaced apart from each other. The branched portion may include a third portion 203 of the second plate. Referring to FIG. 10b, the side plate may include the branched portion 153. The branched portion 153 may be branched from the second portion 152 of the side plate. The branched portion 153 may provide at least two. At least two branched portions 153 spaced apart from each other may be provided on the second portion 152 of the side plate. Referring to FIG. 10c, the first plate may include the branched portion 104. The branched portion may further extend from the second portion 102 of the first plate. The branched portion may extend toward the periphery. The branched portion 104 may be bent to further extend. A direction in which the branched portion extends in FIGS. 10a, 10b, and 10c may be the same as at least one of the extension directions of the extension portion described in FIG. 10.

Figure 11:
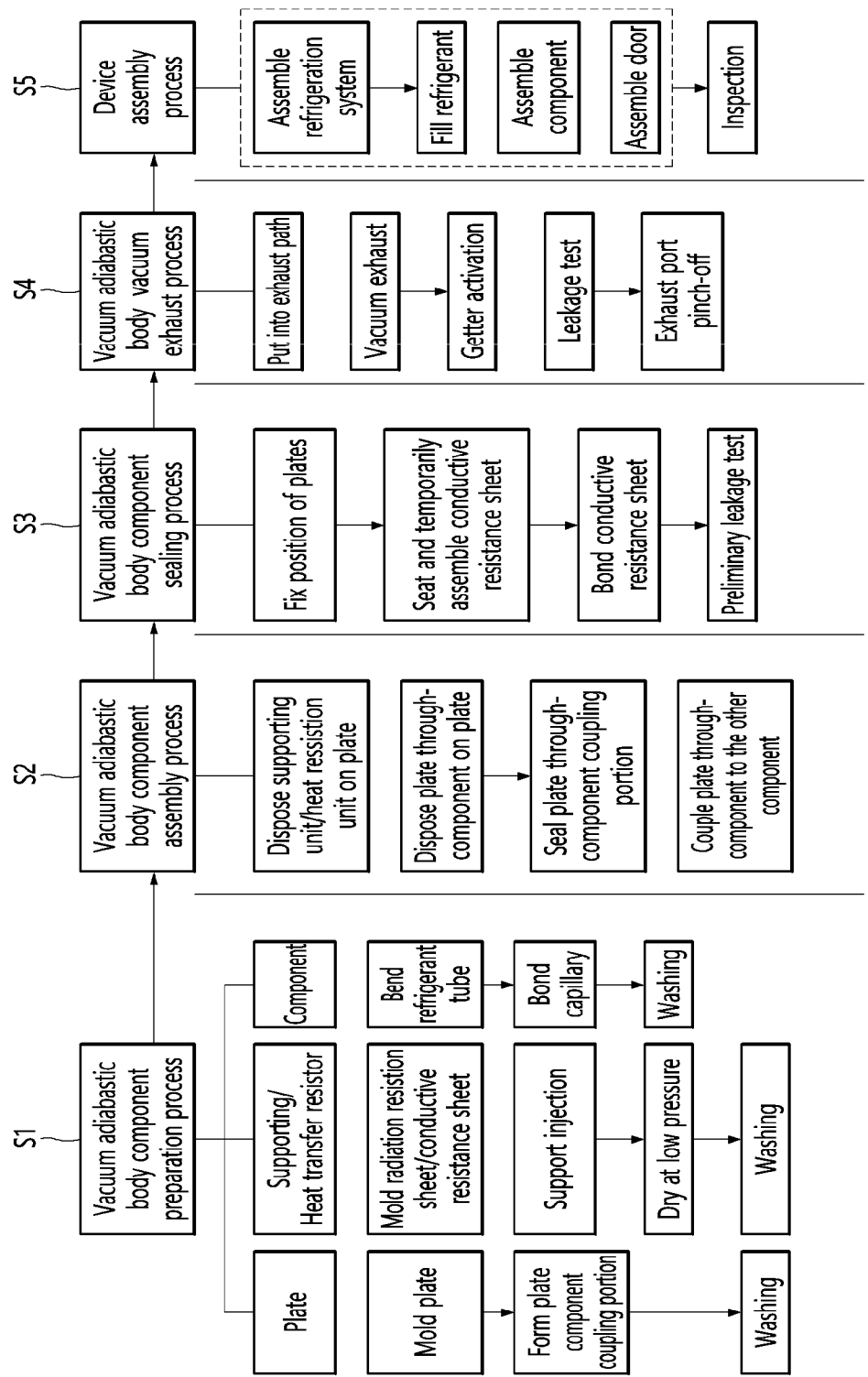
FIG. 11 is a view for explaining a method for manufacturing a vacuum adiabatic body.

FIG. 11 is a view for explaining a process of manufacturing the vacuum adiabatic body.

Optionally, the vacuum adiabatic body may be manufactured by a vacuum adiabatic body component preparation process in which the first plate and the second plate are prepared in advance. Optionally, the vacuum adiabatic body may be manufactured by a vacuum adiabatic body component assembly process in which the first plate and the second plate are assembled. Optionally, the vacuum adiabatic body may be manufactured by a vacuum adiabatic body vacuum exhaust process in which a gas in the space defined between the first plate and the second plate is discharged. Optionally, after the vacuum adiabatic body component preparation process is performed, the vacuum adiabatic body component assembly process or the vacuum adiabatic body exhaust process may be performed. Optionally, after the vacuum adiabatic body component assembly process is performed, the vacuum adiabatic body vacuum exhaust process may be performed. Optionally, the vacuum adiabatic body may be manufactured by the vacuum adiabatic body component sealing process (S3) in which the space between the first plate and the second plate is sealed. The vacuum adiabatic body component sealing process may be performed before the vacuum adiabatic body vacuum exhaust process (S4). The vacuum adiabatic body may be manufactured as an object with a specific purpose by an apparatus assembly process (S5) in which the vacuum adiabatic body is combined with the components constituting the apparatus. The apparatus assembly process may be performed after the vacuum adiabatic body vacuum exhaust process. Here, the components constituting the apparatus means components constituting the apparatus together with the vacuum adiabatic body.

The vacuum adiabatic body component preparation process (S1) is a process in which components constituting the vacuum adiabatic body are prepared or manufactured. Examples of the components constituting the vacuum adiabatic body may include various components such as a plate, a support, a heat transfer resistor, and a tube. The vacuum adiabatic body component assembly process (S2) is a process in which the prepared components are assembled. The vacuum adiabatic body component assembly process may include a process of disposing at least a portion of the support and the heat transfer resistor on at least a portion of the plate. For example, the vacuum adiabatic body component assembly process may include a process of disposing at least a portion of the support and the heat transfer resistor between the first plate and the second plate. Optionally, the vacuum adiabatic body component assembly process may include a process of disposing a penetration component on at least a portion of the plate. For example, the vacuum adiabatic body component assembly process may include a process of disposing the penetration component or a surface component between the first and second plates. After the penetration component may be disposed between the first plate and the second plate, the penetration component may be connected or sealed to the penetration component coupling portion.

An example of a vacuum adiabatic body vacuum exhaust process vacuum is as follows. The present disclosure may be any one of the, examples or a combination of two or more examples. The vacuum adiabatic body vacuum exhaust process may include at least one of a process of inputting the vacuum adiabatic body into an exhaust passage, a getter activation process, a process of checking vacuum leakage and a process of closing the exhaust port. The process of forming the coupling part may be performed in at least one of the vacuum adiabatic body component preparation process, the vacuum adiabatic body component assembly process, or the apparatus assembly process. Before the vacuum adiabatic body exhaust process is performed, a process of washing the components constituting the vacuum adiabatic body may be performed. Optionally, the washing process may include a process of applying ultrasonic waves to the components constituting the vacuum adiabatic body or a process of providing ethanol or a material containing ethanol to surfaces of the components constituting the vacuum adiabatic body. The ultrasonic wave may have an intensity between about 10 kHz and about 50 kHz. A content of ethanol in the material may be about 50% or more. For example, the content of ethanol in the material may range of about 50% to about 90%. As another example, the content of ethanol in the material may range of about 60% to about 80%. As another example, the content of ethanol in the material may be range of about 65% to about 75%. Optionally, after the washing process is performed, a process of drying the components constituting the vacuum adiabatic body may be performed. Optionally, after the washing process is performed, a process of heating the components constituting the vacuum adiabatic body may be performed.

The contents described in FIGS. 1 to 11 may be applied to all or selectively applied to the embodiments described with reference to the drawings below.

As an embodiment, an example of a process associated with the support is as follows. The present disclosure may be any one of the following examples or a combination of two or more examples. The vacuum adiabatic body component preparation process may include a process of manufacturing the support. Before the vacuum adiabatic body vacuum exhaust process is performed, the process of manufacturing the support may be performed. For example, the support may be manufactured through the injection. Optionally, before the vacuum adiabatic body vacuum exhaust process is performed, the process of washing the support may be performed. Before the vacuum adiabatic body vacuum exhaust process is performed or while the vacuum adiabatic body vacuum exhaust process is performed, a process of storing the support under a predetermined condition may be performed. For example, before the vacuum adiabatic body vacuum exhaust process is performed, a primary storage process may be performed, and while the vacuum adiabatic body vacuum exhaust process is performed, a secondary storage process may be performed. For another example, during the vacuum adiabatic body vacuum exhaust process is performed, the storage process may be performed. Examples of the storage process are as follows. As a first example, the storage process may include a process of drying or heating the support. Thus, the outgas sing form the support may be performed. The heating temperature may be greater than a predetermined reference temperature and less than a melting point of the support. The predetermined reference temperature may be a temperature between about 10 degrees and about 40 degrees. The heating temperature may be greater than about 80 degrees and less than about 280 degrees. The heating temperature may be greater than about 100 degrees and less than about 260 degrees. The heating temperature may be greater than about 120 degrees and less than about 240 degrees. The heating temperature may be greater than about 140 degrees and less than about 220 degrees. The heating temperature may be greater than about 160 degrees and less than about 200 degrees. The heating temperature may be greater than about 170 degrees and less than about 190 degrees. The heating temperature in the primary storage process may be less than the heating temperature in the secondary storage process. Optionally, the storage process may include a process of cooling the support. After the process of drying or heating the support is performed, the process of cooling the support may be performed. As a second example, the storage process may include a process of storing the support in a state of a temperature less than atmospheric pressure. Thus, the outgassing form the support may be performed. The storage pressure may be less than a pressure in a vacuum state in which the internal space between the first plate and the second plate is maintained. The storage pressure may be greater than 10E−10 torr and less than atmospheric pressure. The storage pressure may be greater than 10E−9 torr and less than atmospheric pressure. The storage pressure may be greater than 10E−8 torr and less than atmospheric pressure. The storage pressure may be greater than 10E−7 torr and less than atmospheric pressure. The storage pressure may be in a state of being greater than 10E−3 torr and less than atmospheric pressure. The storage pressure may be in a state of being greater than 10E−2 torr and less than atmospheric pressure. The storage pressure may be in a state of being greater than 0.5E−1 torr and less than atmospheric pressure. The storage pressure may be in a state of being greater than 0.5E−1 torr and less than 3E−1 torr. The storage pressure in the primary storage process may be higher than the storage pressure in the secondary storage process. Optionally, the storage process may include a storage process at the atmospheric pressure. After the process of storing the support in a state of the pressure less than the atmospheric pressure is performed, the process of storing the support in the state of the atmospheric pressure may be performed.

Optionally, before the vacuum adiabatic body vacuum exhaust process is performed, a process of coupling a plurality of portions of the support to each other may be performed. For example, the coupling process may include a process of coupling a bar of the support to a connection plate. As another example, the coupling process may include a process of coupling the bar of the support to the support plate.

The process associated with the support may optionally include a process related to the process of storing the support under the predetermined condition. An example of a process sequence related to the process in which the support is stored under the predetermined condition is as follows. The present disclosure may be any one of the following examples or a combination of two or more examples. After the process of drying or heating the support is performed, at least one of the process of storing the support at the temperature less than atmospheric pressure, the process of cooling the support, or the process of storing the support at the atmospheric pressure may be performed. After the process of storing the support at the pressure less than the atmospheric pressure is performed, at least one of the process of drying or heating the support, the process of cooling the support, or the process of storing the support at the atmospheric pressure may be performed. The process of drying or heating the support and the process of storing the support at the pressure less than the atmospheric pressure may be performed at the same time. The process of drying or heating the support and the process of storing the support at the atmospheric pressure may be performed at the same time. The process of storing the support under the condition less than atmospheric pressure and the process of cooling the support may be performed at the same time.

The process associated with the support may optionally include a process related to the process in which the support is coupled. An example of a process sequence related to the process in which the support is coupled is as follows. The present disclosure may be any one of the following examples or a combination of two or more examples. Before the coupling process is performed, a process of providing a separate component separated from the support in a space provided inside the support may be performed. For example, the component may include a heat transfer resistor. After the coupling process is performed, the support may be packaged or stored in a vacuum state. After the process of storing the support under the predetermined condition is performed, a process of coupling a plurality of portions of the support to each other may be performed.

In relation to the support, the process may optionally include a process related to the process of washing the support. An example of a process sequence related to the process of washing the support is as follows. The present disclosure may be any one of the following examples or a combination of two or more examples. After the process of manufacturing the support is performed, at least one of the process of washing the support, the process of storing the support under the predetermined condition, or the process of coupling the plurality of portions of the support to each other may be performed. After the process of washing the support is performed, at least one of the process of storing the support under the predetermined condition or the process of coupling the plurality of portions of the support to each other may be performed. Before the process of washing the support is performed, at least one of the process of storing the support under the predetermined condition or the process of coupling the plurality of portions of the support to each other may be performed.

The process associated with the support may optionally include a process related to the process of providing the support to plate. An example of a process sequence related to the process of providing the support to the plate is as follows. The present disclosure may be any one of the following examples or a combination of two or more examples. Before the vacuum adiabatic body exhaust process is performed, the support may be provided in a space between the first plate and the second plate. Before the vacuum adiabatic body exhaust process is performed, the support may be provided at the inside of the plate or the surface of the plate. Before the vacuum adiabatic body vacuum exhaust process is performed, the support may be coupled to the plate. After the component coupling portion is provided on a portion of the plate, the support may be provided in the space between the first plate and the second plate.

Figure 12:
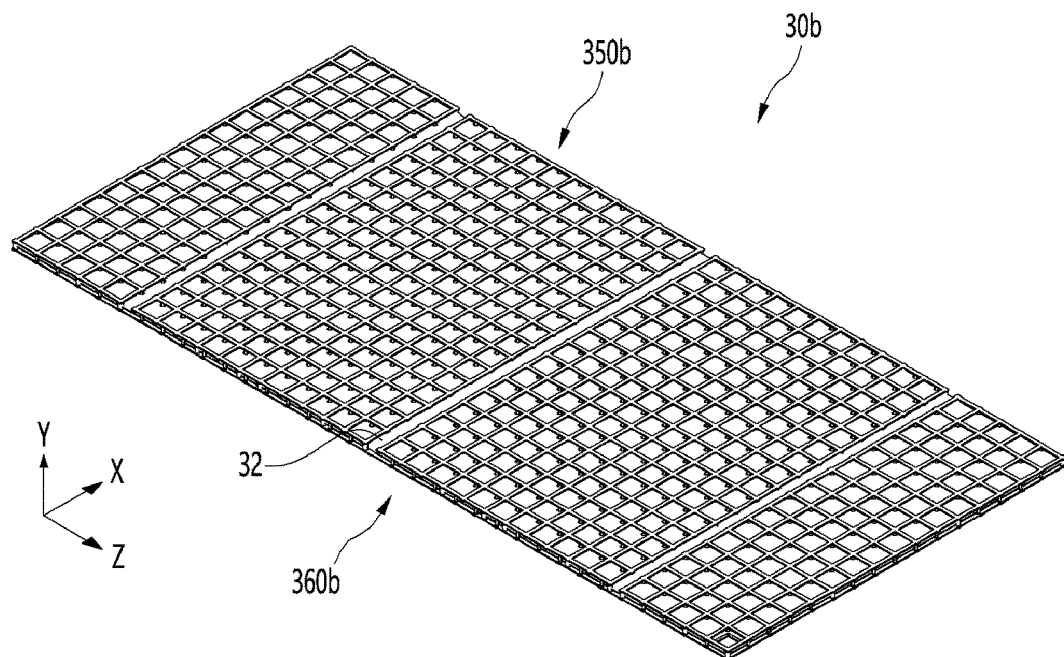
FIG. 12 is a perspective view illustrating a support according to another embodiment.
Figure 13:
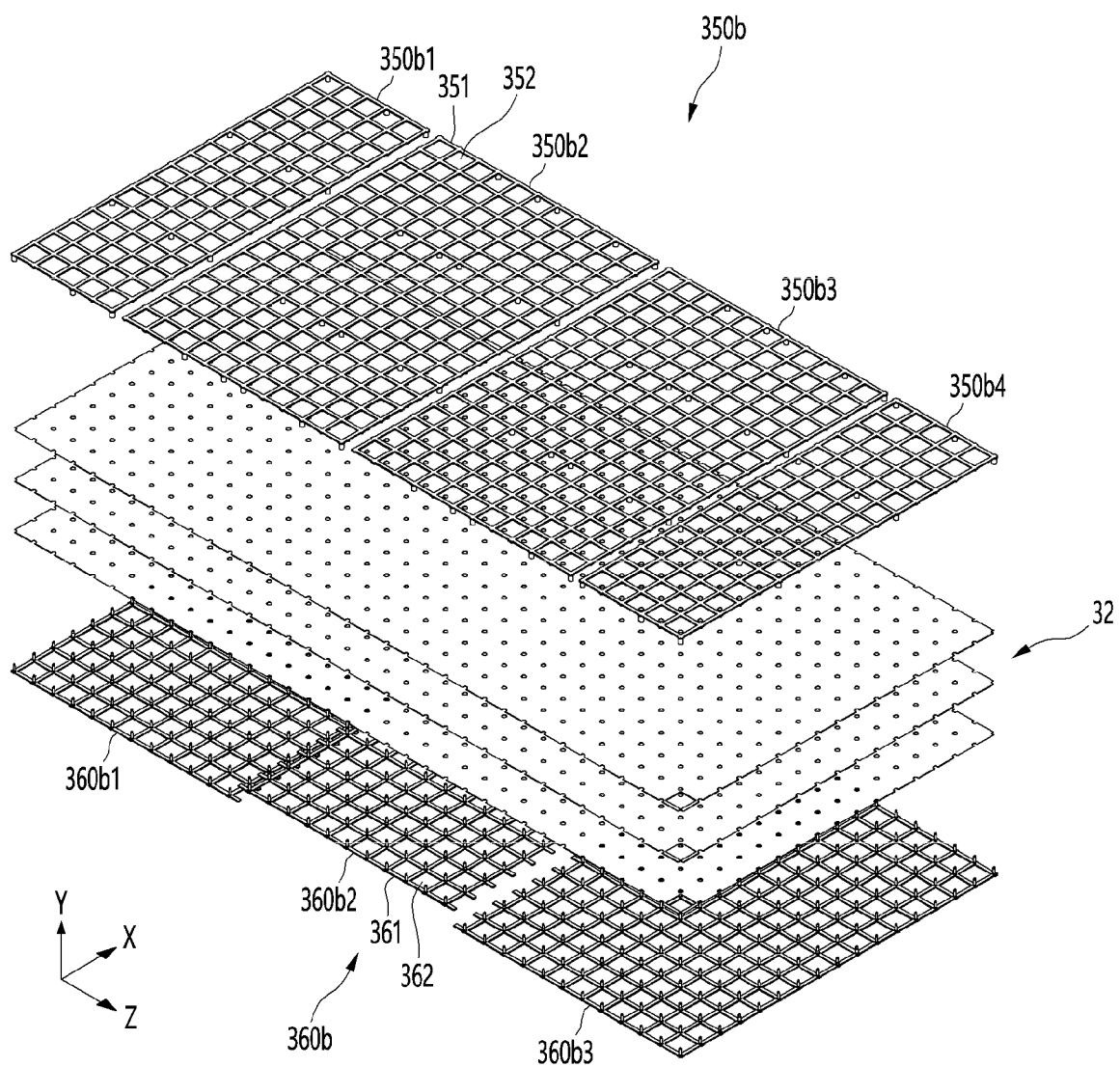
FIG. 13 is an exploded perspective view illustrating the support of FIG. 12.

FIG. 12 is a perspective view illustrating a support according to another embodiment, and FIG. 13 is an exploded perspective view illustrating the support of FIG. 12.

Figure 14:
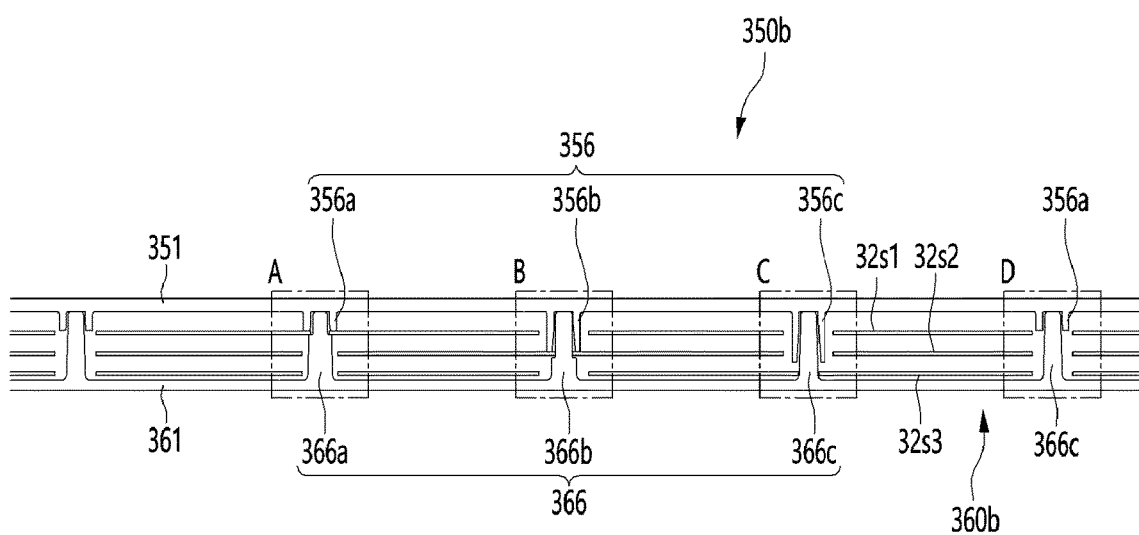
FIG. 14 is a cross-sectional view illustrating a state in which the first support and the second support are coupled.

Referring to FIGS. 12 and 13, a support 30$b$ of this embodiment may include a first support 350$b$, a second support 360$b$ coupled to the first support 350$b$, and at least one radiation resistance sheet 32 disposed between the first support 350$b$ and the second support 360$b$. At least one of the first support 350$b$ and the second support 360$b$ may support the radiation resistance sheet 32 while passing through the radiation resistance sheet 32. If the support 30$b$ includes a plurality of radiation resistance sheets 32, the first support 350$b$ and the second support 360$b$ may support a plurality of radiation resistance sheets 32 in a state in which the plurality of radiation resistance sheets 32 are spaced apart from each other. FIG. 14 illustrates three radiation resistance sheets 32 as an example.

The first support 350$b$ may be in contact with the inner case 110. The second support 360$b$ may contact the outer case 210. Conversely, the first support 350$b$ may contact the outer case 210, and the second support 360$b$ may contact the inner case 110.

The second support 360$b$ may be disposed by coupling a plurality of second support bodies 360$b$1, 360$b$2, and 360$b$3 having the same structure to each other in the Z-axis direction (for example, the vertical direction (longitudinal direction) of the door). The first support 350b may include the first type of first support body 350b1, the second type of first support body 350b2 and 350b3, and the third type of the first support body 350b4. The first to third types of support bodies 350b1, 350b2, 350b3, and 350b4 have the same length in the X-axis direction. A length in the Z-axis direction of the second type of first support body 350b2, and 350b3 is longer than the length of each of the first type of first support body 350b1 and the third type of first support body 350b4. A first type of first support body 350b1 may be coupled to the second support body 360b1 arranged first among the plurality of second support bodies 360b1, 360b2, and 360b3. In addition, a portion of the second type of first support body 350b2 may be coupled to the firstly arranged second support body 360b. In this case, the first type of first support body 350b1 and the second type of first support body 350b2 may be spaced apart from each other in the Z-axis direction. In the second support body 360b2 arranged secondly from the plurality of second support bodies 360b1, 360b2, and 360b3, another portion of a second type of the first support body 350b2 and a portion of another second type of the first support body 350b3 may be coupled to each other. In the second support body 360b3 arranged thirdly from the plurality of second support bodies 360b1, 360b2, and 360b3, another portion of the another second type of the first support body 350b3 and the third type of the first support body 350b4 may be coupled to each other.

FIG. 14 is a cross-sectional view illustrating a state in which the first support and the second support are coupled to each other.

Referring to FIGS. 13 and 14, the first support 350b may include a first support plate 351 formed in a grid shape. In other words, the first support plate 351 may include a plurality of through-holes 352. For example, two first extension portions extending in the Z-axis direction and two second extension portions extending in the X-axis direction may define one through-hole 352. A plurality of through-holes 352 may be arranged in plurality in each of the X-axis and the Z-axis. The first support 350b may include a plurality of spacer coupling portions 356 extending from the first support plate 351 in a direction crossing the first support plate 351. For example, the plurality of spacer coupling portions 356 may extend in the Y-axis direction from the first support plate 351. Each spacer coupling portion 356 may be positioned at a portion where the first extension portion and the second extension portion are connected to each other. The plurality of spacer coupling portions 356 may be divided based on a length in the Y-axis direction, for example, a height. The plurality of spacer coupling portions 356 may include some or all of the first spacer coupling portion 356a, the second spacer coupling portion 356b, and the third spacer coupling portion 356c. Hereinafter, it will be described as an example that the plurality of spacer coupling portions 356 include a first spacer coupling portion 356a, a second spacer coupling portion 356b, and a third spacer coupling portion 356c. The second spacer coupling portion 356b is longer than the first spacer coupling portion 356a, and the third spacer coupling portion 356c is longer than the second spacer coupling portion 356b. Among the plurality of spacer coupling portions 356, the number of first spacer coupling portions 356a is the largest and the number of second spacer coupling portions 356b is the smallest. In the first support 350b, some rows and some columns may include only the first spacer coupling portion 356a. In the first support 350b, some other rows may include only the first spacer coupling portion 356a and the second spacer coupling portion 356b. In this case, a plurality of first spacer coupling portions 356a may be provided between the two second spacer coupling portions 356b spaced apart from each other. In the first support 350b, another partial row may include only the first spacer coupling portion 356a and the third spacer coupling portion 356c. In this case, a plurality of first spacer coupling portions 356a may be provided between the two third spacer coupling portions 356c spaced apart from each other. In the first support 350b, some other columns may include all of the first spacer coupling portion 356a, the second spacer coupling portion 356b, and the third spacer coupling portion 356c. In a column including the second spacer coupling portion 356b and the third spacer coupling portion 356c, at least two of the third spacer coupling portions 356c may be positioned to be adjacent to each other. Two columns including only the third spacer coupling portion 356c and the first spacer coupling portion 356a may be positioned adjacent to each other. In a column including the second spacer coupling portion 356b and the third spacer coupling portion 356c, at least one first spacer coupling portion 356a is provided between the second spacer coupling portion 356b and the third spacer coupling portion 356c.

The second support 360b may include a second support plate 361 having a grid shape. The second support plate 361 may include a plurality of through-holes 362. For example, two first extension portions extending in the Z-axis direction and two second extension portions extending in the X-axis direction may define one through-hole 362. A plurality of through-holes 362 may be arranged in plurality in each of the X-axis and the Z-axis. The second support 360b may include a plurality of spacers 366 extending from the second support plate 361 in a direction crossing the second support plate 361. For example, the plurality of spacers 366 may extend from the second support plate 361 in the Y-axis direction. Each spacer 366 may be positioned at a portion where the first extension portion and the second extension portion are connected. Each of the plurality of spacers 366 may be coupled to each of the plurality of spacer coupling portions 356. In the present embodiment, one bar is completed by coupling one spacer 366 and one spacer coupling portion 356. Accordingly, the plurality of bars are completed by coupling the first support 350b and the second support 360b of the present embodiment. In the above description, it has been described that the first support 350b includes the spacer coupling portion 356 and the second support 360b includes the spacer 366, but on the contrary, it is also possible that the first support 350b includes the spacer 366 and the second support 360b includes a spacer coupling portion. In any case, any one of the spacers is coupled with any one of the spacer coupling portions to form a bar. The plurality of spacers 366 may include some or all of the first spacer 366a, the second spacer 366b, and the third spacer 366c. Hereinafter, it will be described as an example that the plurality of spacers 366 includes a first spacer 366a, a second spacer 366b, and a third spacer 366c. In the second support 360b, some rows and some columns may include only the third spacer 366c. In the second support 360b, some other rows may include only the third spacer 366c and the first spacer 366a. In the second support 360b, another partial row may include only the third spacer 366c and the second spacer 366b. In the second support 360b, some columns may include all of the first spacer 366a, the second spacer 366b, and the third spacer 366c. In a column including the first spacer 366a and the second spacer 366b, the first spacer 366a and the second spacer 366b may be located adjacent to each other. In the second support 360b, the number of rows including the third spacer 366c is greater than the number of rows including the first spacer 366a and the third spacer 366c. In the second support 360b, the number of rows including the third spacer 366c is greater than the number of rows including the second spacer 366b and the third spacer 366c. In the second support 360b, the number of columns including the third spacers 366c is greater than the number of columns including the first spacer 366a to the third spacer 366c.

Figure 15:
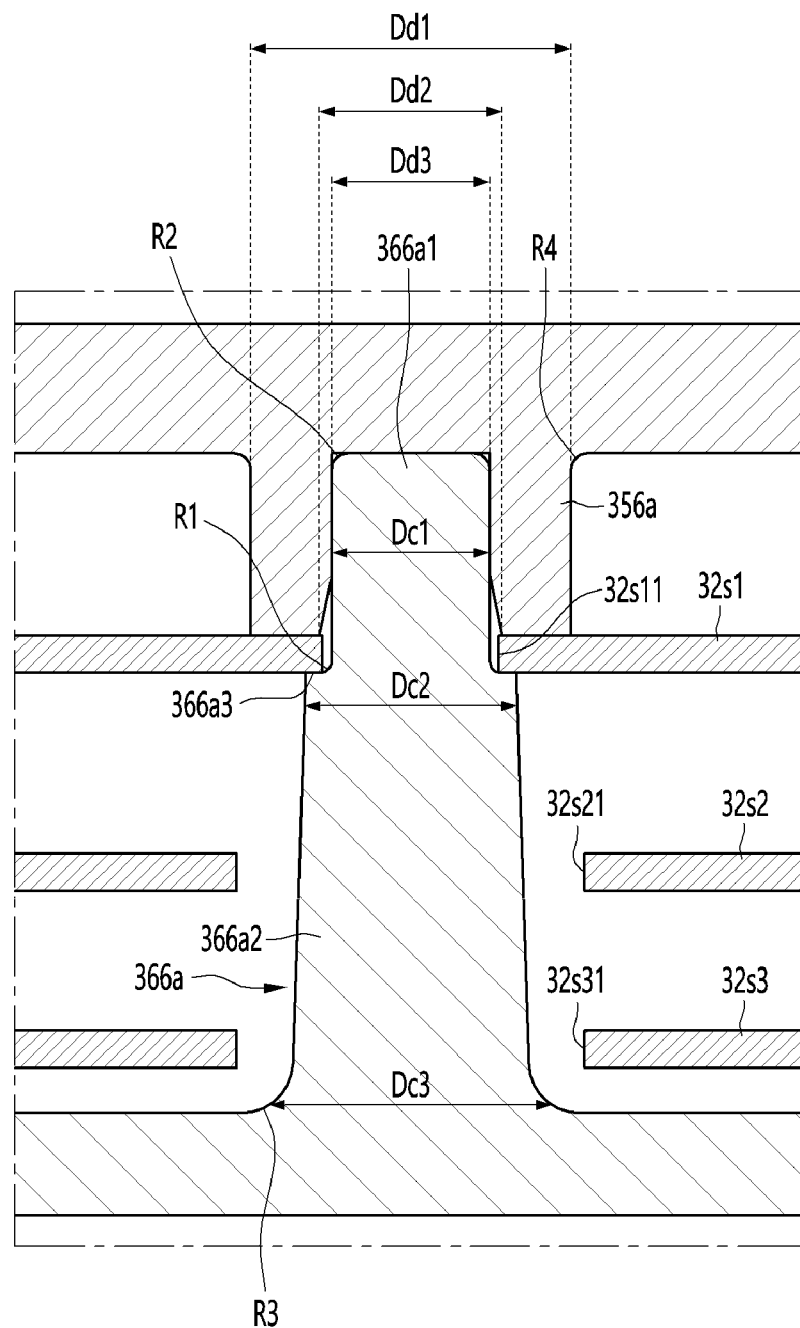
FIG. 15 is an enlarged view illustrating part A of FIG. 14.
Figure 16:
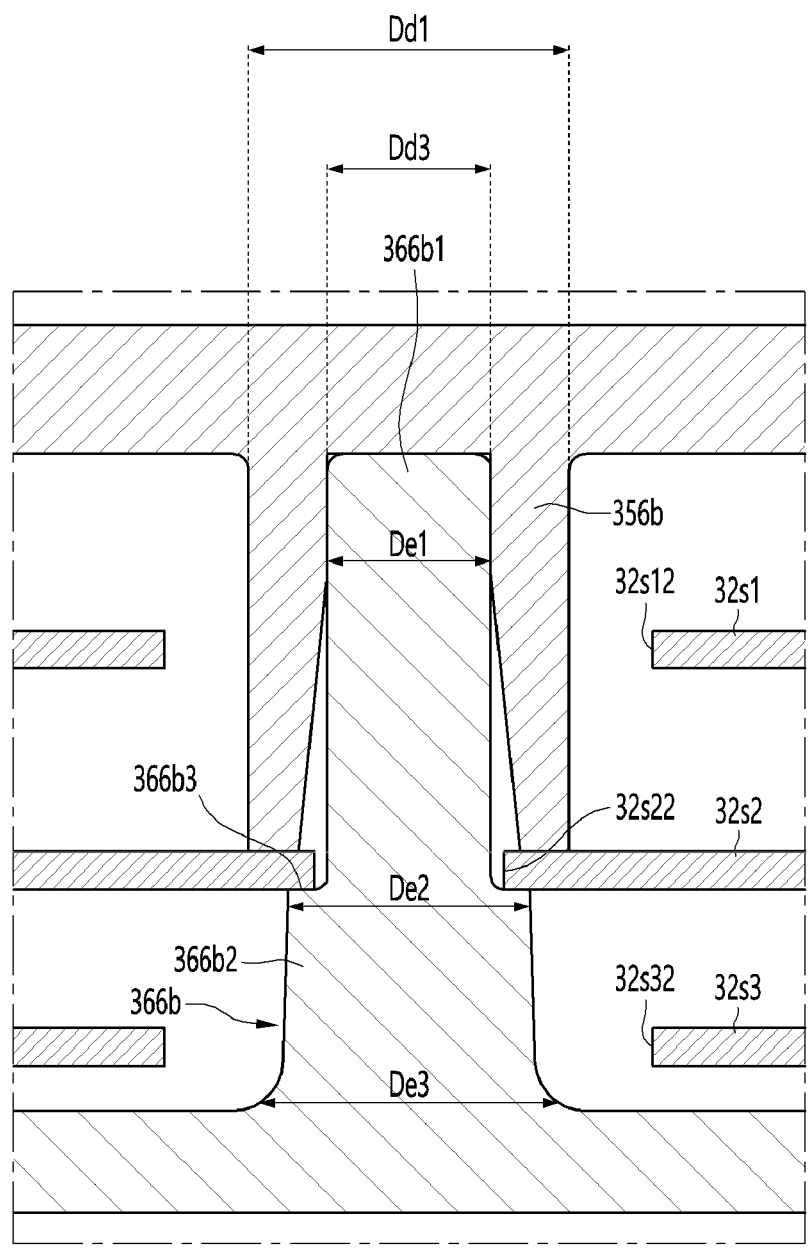
FIG. 16 is an enlarged view illustrating part B of FIG. 14.
Figure 17:
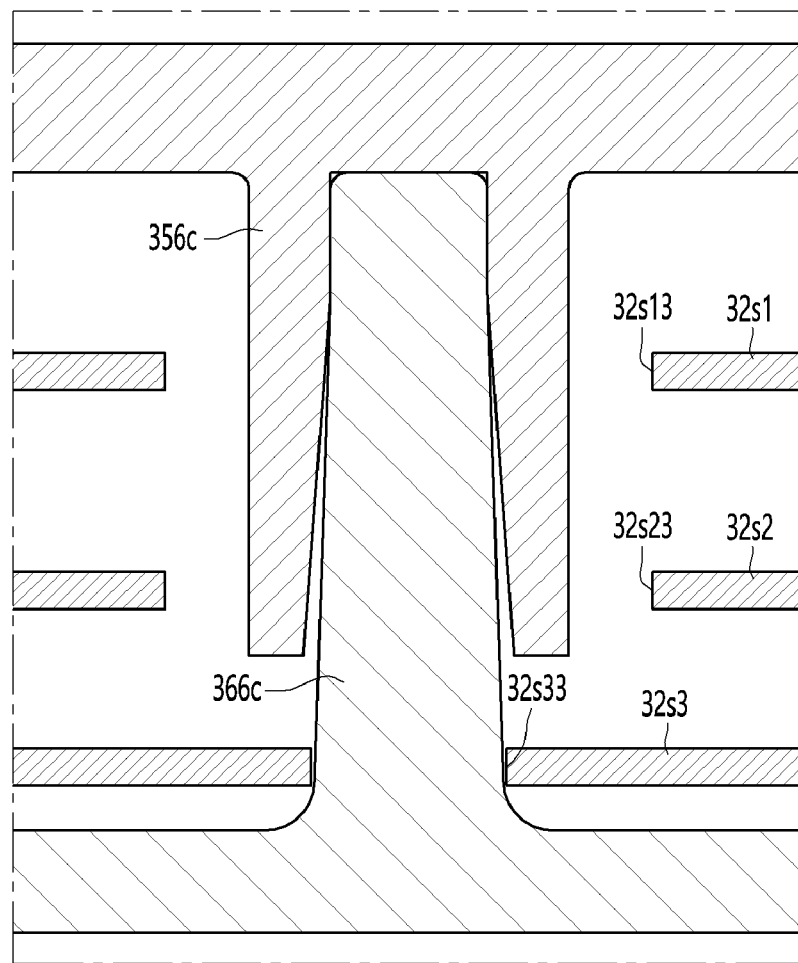
FIG. 17 is an enlarged view illustrating part C of FIG. 14.
Figure 18:
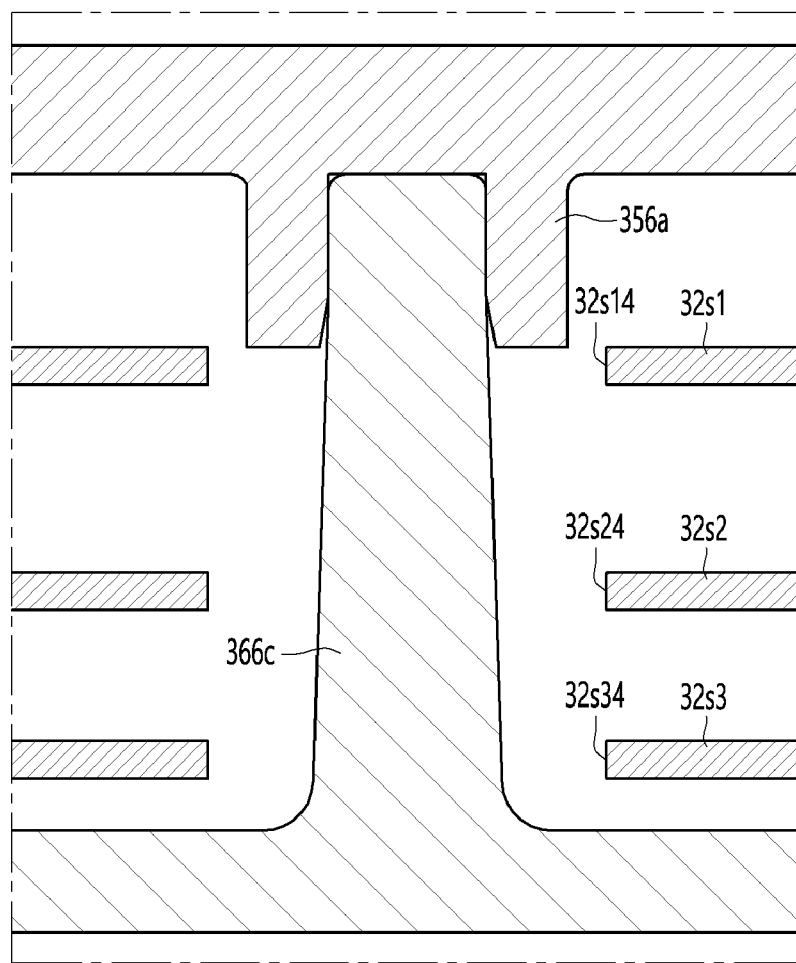
FIG. 18 is an enlarged view illustrating part D of FIG. 14.

FIG. 15 is an enlarged view illustrating part A of FIG. 14, and FIG. 16 is an enlarged view illustrating part B of FIG. 14. FIG. 17 is an enlarged view illustrating part C of FIG. 14, and FIG. 18 is an enlarged view illustrating part D of FIG. 14.

Referring to FIGS. 14 to 18, the first spacer 366a of the second support 360b may be coupled to the first spacer coupling portion 356a of the first support 350b. A first bar is defined by the coupling of the first spacer 366a and the first spacer coupling portion 356a. The second spacer 366b of the second support 360b may be coupled to the second spacer coupling portion 356b of the first support 350b. A second bar is defined by coupling to the second spacer 366b and the second spacer coupling portion 356a. The third spacer 366c of the second support 360b may be coupled to the third spacer coupling portion 356c of the first support 350b. A third bar is defined by coupling to the third spacer 366c and the third spacer coupling portion 356b. The third spacer 366c of the second support 360b may be coupled to the first spacer coupling portion 356a of the first support 350b. A fourth bar is defined by coupling to the third spacer 366c and the first spacer coupling portion 356a. In other words, In the present embodiment, four types of bars may be defined by the coupling of the first support 350b and the second support 360b. In the description of FIGS. 14 to 18, "a length" means a length in the arrangement direction of the first support plate 351 and the second support plate 361.

Meanwhile, the support 30b may include a first sheet 32s1, a second sheet 32s2 spaced apart from the first sheet 32s1, and a third sheet 32s3 spaced apart from the second sheet 32s2. The first sheet 32s1 to the third sheet 32s1 are arranged to be spaced apart in the Y-axis direction, the first sheet 32s1 is located closest to the first support plate 351, and the third sheet 32s3 is located closest to the second support plate 361. The second sheet 32s2 is positioned between the first sheet 32s1 and the third sheet 32s3.

FIG. 15 illustrates a first bar. Referring to FIG. 15, the first spacer 366a may pass through the first holes 32s11, 32s21, and 32s31 formed in each of the plurality of sheets 32s1, 32s2, and 32s3 to couple to the first spacer coupling portion 356a. In a state in which the first spacer 366a is coupled to the first spacer coupling portion 356a, the first spacer 366a supports the first sheet 32s1. On the other hand, the first spacer 366a and the first spacer coupling portion 356a are spaced apart from the second sheet 32s2 and the third sheet 32s3. Accordingly, the first bar supports the first sheet 32s1 and does not support the second sheet 32s2 and the third sheet 32s3. The length of the first spacer 366a is longer than the length of the first spacer coupling portion 356a. A part of the first spacer 366a may be inserted into the first spacer coupling portion 356a. For example, the first spacer coupling portion 356a may be formed in a cylindrical shape. The outer diameter Db1 of the first spacer coupling portion 356a may be greater than the maximum value Dc3 of the outer diameter of the first spacer 366a. The outer diameter Db1 of the first spacer coupling portion 356a may decrease as the distance from the first support plate 351 increases. An inner diameter Db3 of the first spacer coupling portion 356a may be the same as a diameter of a portion of the first spacer 366a. The diameter Db2 of the entrance of the first spacer coupling portion 356a is may be larger than the inner diameter Db3 of the first spacer coupling portion 356a such that the first spacer 366a can be easily inserted into the first spacer coupling portion 356a. In other words, a portion of the inner peripheral surface of the first spacer coupling portion 356a may have an inner diameter increasing toward the entrance. Due to the change in the inner diameter, a portion of the inner peripheral surface of the first spacer coupling portion 356a is inclined by a first angle with the vertical line (the line in the Y-axis direction of FIG. 13). By designing the shape of the first spacer coupling portion 356a, the mold may be easily separated from the first spacer coupling portion 356a during the injection molding process of the first support 350b. The first spacer 366a may include a second portion 366a2 extending from the second support plate 361 and a first portion 366a1 extending from the second portion 366a2 and having a diameter smaller than a diameter of the second portion 366a2. A stepped portion 366a3 may be formed between the first portion 366a1 and the second portion 366a2 due to a difference in diameter between the first portion 366a1 and the second portion 366a2. The length of the second part 366a2 is formed to be longer than the length of the first portion 366a1. A length of the first portion 366a1 is longer than a length of the first spacer coupling portion 356a. The first portion 366a1 may be press-fitted into the first spacer coupling portion 356a. When the first portion 366a1 is inserted into the first spacer coupling portion 356a, the first spacer coupling portion 356a may be spaced apart from the stepped portion 366a3. A diameter Dc2 (minimum diameter) of a point adjacent to the first portion 366a1 in the second portion 366a2 is smaller than a diameter Dc3 (maximum diameter) of a point adjacent to the second support plate 361. For example, the diameter of the second portion 366a2 may decrease toward the first spacer coupling portion 356a. Due to the change in diameter of the second part 366a2, the outer peripheral surface of the second part 366a2 is inclined by a second angle with respect to the vertical line (the expansion line in the Y direction in FIG. 13). In this case, the second angle is smaller than the first angle. A diameter Dc2 of a point adjacent to the first portion 366a1 in the second portion 366a2 is greater than a diameter Dc1 of the first portion 366a1. The diameter of the first portion 366a1 may decrease as the distance from the second portion 366a2 increases. Alternatively, the first portion 366a1 may include a first part whose diameter decreases as the distance from the second part 366a2 increases and a second part that extends from the first portion and has a constant diameter. In this case, the second part may be coupled to the first spacer coupling portion 356a. The diameter reduction rate of the section in which the diameter is variable in the first portion 366a1 may be smaller than the diameter reduction rate of the section in which the diameter is variable in the second portion 366a2. Alternatively, the first portion 366a1 may have a constant diameter as a whole. By designing the shape of the first spacer 366a, the mold can be easily separated from the first spacer 366a during the injection molding process of the second support 360b. A diameter Da2 of a point adjacent to the first portion 366a1 in the second portion 366a2 is greater than an inner diameter Db3 of the first spacer coupling portion 356a. In addition, the diameter of the first hole 32s11 of the first sheet 32s1 is greater than the diameter Dc1 of the first portion 366a1 and smaller than the minimum diameter Dc2 of the second portion 366a2. Accordingly, the stepped portion 366a3 of the first spacer 366a may support the first sheet 32s1. In this case, the first sheet 32s1 may be in contact with the first spacer coupling portion 356a. In the present embodiment, the portion in contact with the first sheet 32s1 may be described as supporting the first sheet 32s1. For example, the surface facing the second support plate 361 from the first spacer coupling portion 356a and the stepped part 366a3 of the first spacer 366a may support the first sheet 32s1. In this case, the area of the surface on which the first spacer 366a supports the first sheet 32s1 may be different from the area of the surface on which the first spacer coupling portion 356a supports the first sheet 32s1. For example, a support area of one of the first spacer 366a and the first spacer coupling portion 356a, which has a longer length may be smaller than a support area of one of the first spacer 366a and the first spacer coupling portion 356a, which has a shorter length. In this case, heat conduction in a direction passing through the first bar may be reduced. Specifically, the area of the surface on which the first spacer coupling portion 356a supports the first sheet 32s1 is greater than the area of the surface on which the first spacer 366a supports the first sheet 32s1. After the first spacer 366b passes through the first sheet 32s1, when being coupled to the first spacer coupling portion 356a, since the first spacer coupling portion 356a has a large contact area with the first sheet 32s1, the bending phenomenon of the first sheet 32s1 may be minimized. Although not limited, the difference between the outer diameter Db1 and the inner diameter Db2 of a side of the entrance of the first spacer coupling portion 356a is smaller than the diameter Dc1 of the first portion 366a1, and may be greater than ⅓ of the diameter Dc1 of the first portion 366a1. Due to this structure, while the shape of the first spacer coupling portion 356a is maintained during the injection process of the first support 350b, the strength can be secured to a certain level or more. The diameters of the first holes 32s21 and 32s31 of the second sheet 32s2 and the third sheet 32s3 are larger than the maximum diameter Dc3 of the second part 366a2. Accordingly, the second sheet 32s2 and the third sheet 32s3 are spaced apart from the first spacer 366a. As such, when the second sheet 32s2 and the third sheet 32s3 are spaced apart from the first bar in addition to the first sheet 32s1 supported by the first bar, heat conduction between the first bar and the second sheet 32s2 and the first bar and the third sheet 32s3 may be prevented. The length and outer diameter Db1 of the first spacer coupling portion 356a may be greater than the thickness of the first support plate 351 (the length in the Y-axis direction of FIG. 13). The length and diameter Dc3 of the first spacer 366a may be greater than the thickness of the second support plate 361 (the length in the Y-axis direction of FIG. 13). A diameter Dc1 of the first portion 366a1 may be greater than a thickness of the second support plate 361. A border area between the first spacer coupling portion 356a and the first support plate 351 may be rounded. The circumference of the end portion of the first portion 366a1 may be rounded. A border area between the first portion 366a1 and the stepped portion 366a3 may be rounded. A border area between the first spacer 366a and the second support plate 361 may be rounded. The radius of curvature R4 at the border area between the first spacer coupling portion 356a and the first support plate 351 may be the same as or similar to the radius of curvature R2 around the end portion of the first portion 366a1. A radius of curvature R2 around an end portion of the first portion 366a1 may be greater than a radius of curvature R1 at a border area between the first portion 366a1 and the stepped portion 366a3. The radius of curvature R3 at the border area between the first spacer 366a and the second support plate 361 may be greater than the radius of curvature R4 at the border area between the first spacer coupling portion 356a and the first support plate 351. The radius of curvature R3 at the border area between the first spacer 366a and the second support plate 361 may be twice or more the radius of curvature R4 at the border area between the first spacer coupling portion 356a and the first support plate 351.

FIG. 16 illustrates a second bar. Referring to FIG. 16, the second spacer 366b may pass through the second holes 32s12, 32s22, and 32s32 formed in each of the plurality of sheets 32s1, 32s2, and 32s3 to couple to the second spacer coupling portion 356b. In a state in which the second spacer 366b is coupled to the second spacer coupling portion 356b, the second spacer 366b supports the second sheet 32s2. On the other hand, the second spacer 366b and the second spacer coupling portion 356b are spaced apart from the first sheet 32s1 and the third sheet 32s3. Accordingly, the second bar supports the second sheet 32s2 and does not support the first sheet 32s1 and the third sheet 32s3. The length of the second spacer 366b is longer than the length of the second spacer coupling portion 356b. A part of the second spacer 366b may be inserted into the second spacer coupling portion 356b. For example, the second spacer coupling portion 356b may be formed in a cylindrical shape. An outer diameter Dd1 of the second spacer coupling portion 356b may be greater than a maximum diameter De3 of the second spacer 366b. The outer diameter Dd1 of the second spacer coupling portion 356b may decrease as the distance from the first support plate 351 increases. An inner diameter Dd3 of the second spacer coupling portion 356b may be the same as a diameter of a portion of the second spacer 366b. The diameter Dd2 of the entrance of the second spacer coupling portion 356b may be larger than the inner diameter Dd3 of the second spacer coupling portion 356b so that the second spacer 366b can be easily inserted into the second spacer coupling portion 356b. In other words, a portion of the inner peripheral surface of the second spacer coupling portion 356b may have an inner diameter increasing toward the entrance. Due to the change in the inner diameter, a portion of the inner peripheral surface of the second spacer coupling portion 356b is inclined by a third angle with the vertical line (the line in the Y-axis direction in FIG. 13). By designing the shape of the second spacer coupling portion 356b, the mold may be easily separated from the second spacer coupling portion 356b during the injection molding process of the first support 350b. The second spacer 366b may include a second portion 366b2 extending from the second support plate 361 and a first portion 366b1 extending from the second portion 366b2 and having a diameter smaller than a diameter of the second portion 366b2. A stepped portion 366b3 may be formed between the first portion 366b1 and the second portion 366b2 due to a difference in diameter between the first portion 366b1 and the second portion 366b2. The length of the second part 366b2 is shorter than the length of the first portion 366b1. A length of the first portion 366b1 is longer than a length of the second spacer coupling portion 356b. The first portion 366b1 may be press-fitted into the second spacer coupling portion 356b. When the first portion 366b1 is inserted into the second spacer coupling portion 356b, the second spacer coupling portion 356b may be spaced apart from the stepped portion 366b3. A diameter De2 (minimum diameter) of a point adjacent to the first portion 366b1 in the second portion 366b2 is smaller than a diameter De3 (maximum diameter) of a point adjacent to the second support plate 361. For example, the diameter of the second portion 366b2 may decrease toward the second spacer coupling portion 356b. Due to the change in diameter of the second part 366b2, the outer peripheral surface of the second part 366b2 is inclined by a fourth angle with respect to the vertical line (the expansion line in the Y direction in FIG. 13). In this case, the fourth angle is smaller than the third angle. The fourth angle may be smaller than the second angle. A diameter De2 of a point adjacent to the first portion 366b1 in the second portion 366b2 is greater than a diameter De1 of the first portion 366b1. The diameter of the first portion 366b1 may decrease as the distance from the second part 366b2 increases. Alternatively, the first portion 366b1 may include a first part whose diameter decreases as the distance from the second part 366b2 increases and a second part that extends from the first part and has a constant diameter. In this case, the second part may be coupled to the second spacer coupling portion 356b. Alternatively, the first portion 366b1 may have a constant diameter as a whole. By designing the shape of the second spacer 366b, the mold can be easily separated from the second spacer 366b during the injection molding process of the second support 360b. A minimum diameter De2 of the second portion 366b2 is greater than an inner diameter Dd3 of the second spacer coupling portion 356b. The minimum diameter De2 of the second portion 366b2 may be equal to, greater than, or smaller than the diameter Dd2 of the entrance of the second spacer coupling portion 356b. A maximum diameter De3 of the second portion 366b2 is smaller than an outer diameter Dd1 of the second spacer coupling portion 356b. A diameter of the second hole 32s22 of the second sheet 32s2 is greater than a diameter De1 of the first portion 366b1 and smaller than a minimum diameter De2 of the second portion 366b2. Accordingly, the stepped portion 366b3 of the second spacer 366b may support the second sheet 32s2. The diameters of the second holes 32s22 and 32s32 of the first sheet 32s1 and the third sheets 32s3 are larger than the outer diameter Dd1 of the second spacer coupling portion 356b. Accordingly, the first sheet 32s1 and the third sheet 32s3 are spaced apart from the second spacer 366b and the second spacer coupling portion 356b. As such, when the first sheet 32s1 and the third sheet 32s3 are spaced apart from the second bar in addition to the second sheet 32s2 supported by the second bar, Heat conduction between the second bar and the first sheet 32s1 and the second bar and the third sheet 32s3 may be prevented. A length and an outer diameter Dd1 of the second spacer coupling portion 356b may be greater than a thickness of the first support plate 351. A length and a diameter De3 of the second spacer 366b may be greater than a thickness of the second support plate 361. A diameter De1 of the first portion 366b1 may be greater than a thickness of the second support plate 361.

FIG. 17 illustrates a third bar. Referring to FIG. 17, the third spacer 366c may pass through third holes 32s13, 32s23, and 32s33 formed in each of the plurality of sheets 32s1, 32s2 and 32s3 to couple to the third spacer coupling portion 356c. In a state in which the third spacer 366c is coupled to the third spacer coupling portion 356c, the third spacer 366c supports the third sheet 32s3. On the other hand, the third spacer 366c and the third spacer coupling portion 356c are spaced apart from the first sheet 32s1 and the second sheet 32s2. Accordingly, the third bar supports the third sheet 32s3 and does not support the first sheet 32s1 and the second sheet 32s2. A length of the third spacer 366c is longer than a length of the third spacer coupling portion 356c. A portion of the third spacer 366c may be inserted into the third spacer coupling portion 356c. For example, the third spacer coupling portion 356c may be formed in a cylindrical shape. An outer diameter of the third spacer coupling portion 356c may be greater than a maximum diameter of the third spacer 366c. The outer diameter of the third spacer coupling portion 356c may decrease as the distance from the first support plate 351 increases. An inner diameter of the third spacer coupling portion 356c may be the same as a diameter of a portion of the third spacer 366c. The diameter of the entrance of the third spacer coupling portion 356c is greater than the inner diameter of the third spacer coupling portion 356c so that the third spacer 366c can be easily inserted into the third spacer coupling portion 356c. In other words, a portion of the inner peripheral surface of the third spacer coupling portion 356c may have an inner diameter increasing toward the entrance. Due to the change in the inner diameter, a portion of the inner peripheral surface of the third spacer coupling portion 356c is inclined by a fifth angle with the vertical line (the line in the Y-axis direction of FIG. 13). By designing the shape of the third spacer coupling portion 356c, the mold can be easily separated from the third spacer coupling portion 356c during the injection molding process of the first support 350b. The third spacer 366c may be formed to have a diameter that decreases as the distance from the second support plate 361 increases as a whole. A part of the third spacer 366c may be press-fitted into the third spacer coupling portion 356b. Alternatively, the third spacer 366c may include a first part whose diameter decreases as the distance from the second support plate 361 increases and a second part that extends from the first part and has a constant diameter. In this case, the second part may be press-fitted into the third spacer coupling portion 356c. By designing the shape of the third spacer 366c, the mold can be easily separated from the third spacer 366c during the injection molding process of the second support 360b. Due to the change in the diameter of the third spacer 366c, the outer peripheral surface of the third spacer 366c is inclined by a sixth angle with respect to the vertical line (the expansion line in the Y direction of FIG. 13). In this case, the sixth angle is smaller than the fifth angle. The sixth angle may be smaller than the fourth angle. A maximum diameter of the third spacer 366c may be smaller than a maximum diameter of the first spacer 366a. A maximum diameter of the second spacer 366b may be greater than a maximum diameter of the first spacer 366a. The diameter of the third hole 32s33 of the third sheet 32s3 is greater than the minimum diameter of the third spacer 366c and smaller than the maximum diameter of the third spacer 366c. In this case, the diameter of the third hole 32s33 of the third sheet 32s3 is similar to the maximum diameter of the third spacer 366c. Accordingly, the third sheet 32s3 may be supported by the outer peripheral surface of the third spacer 366c at a position adjacent to the second support plate 361. A diameter of each of the third holes 32s13 and 32s23 of the first sheet 32s1 and the second sheet 32s2 is larger than the outer diameter of the third spacer coupling portion 356c. Accordingly, the first sheet 32s1 and the second sheet 32s2 are spaced apart from the third spacer 366c and the third spacer coupling portion 356c. As such, when the first sheet 32s1 and the second sheet 32s2 are spaced apart from the third bar in addition to the third sheet 32s3 supported by the third bar, the heat conduction between the third bar and the first sheet 32s1 and the third bar and the second sheet 32s2 may be prevented. A length and an outer diameter of the third spacer coupling portion 356c may be greater than a thickness of the first support plate 351. A length and a diameter of the third spacer 366c may be greater than a thickness of the second support plate 361.

FIG. 18 illustrates a fourth bar. Referring to FIG. 18, the third spacer 366c may pass through the fourth holes 32s14, 32s24, and 32s34 formed in each of the plurality of sheets 32*s*1, 32*s*2, and 32*s*3 to couple to the first spacer coupling portion 356*a*. When the third spacer 366*c* is coupled to the first spacer coupling portion 356*a*, the third spacer 366*c* does not support the first to third sheets 32*s*1, 32*s*2, and 32*s*3. In other words, the third spacer 366*c* and the first spacer coupling portion 356*a* are spaced apart from the first sheet 32*s*1 to the third sheet 32*s*3. Accordingly, the fourth bar does not support the first to third sheets 32*s*1, 32*s*2, and 32*s*3. The diameters of the fourth holes 32*s*14, 32*s*24, and 32*s*34 of the first to third sheets 32*s*1, 32*s*2, and 32*s*3 are larger than the outer diameter of the first spacer coupling portion 356*a*. Since the structures of the third spacer 366*c* and the first spacer coupling portion 356*a* have been previously described, a detailed description thereof will be omitted.

Figure 19:
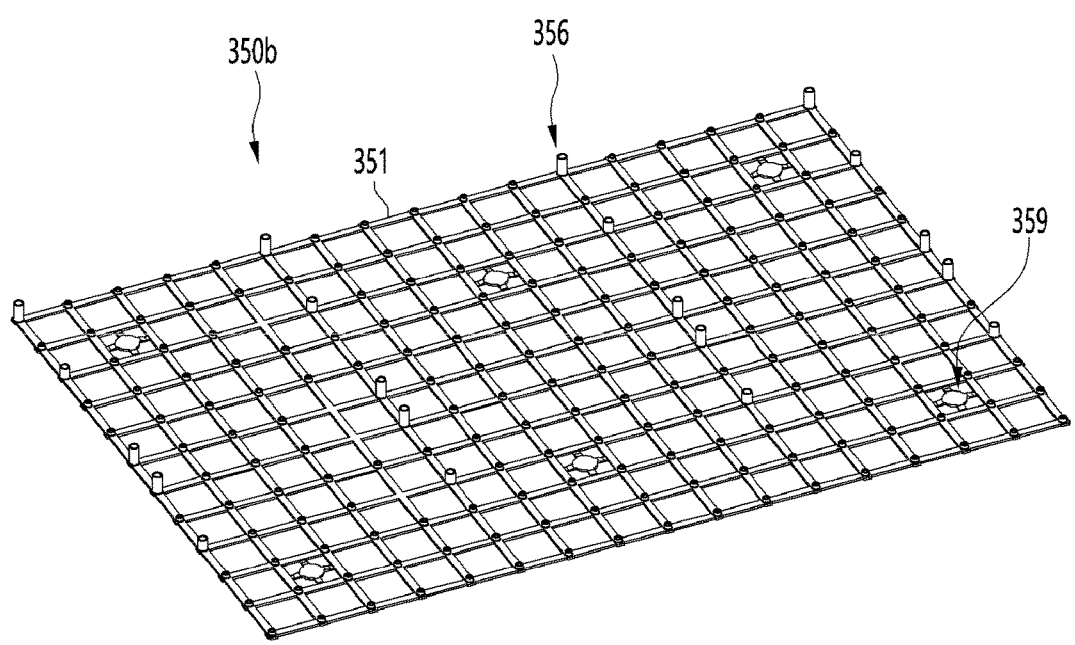
FIG. 19 is a perspective view illustrating the first support viewed from the lower side.
Figure 20:
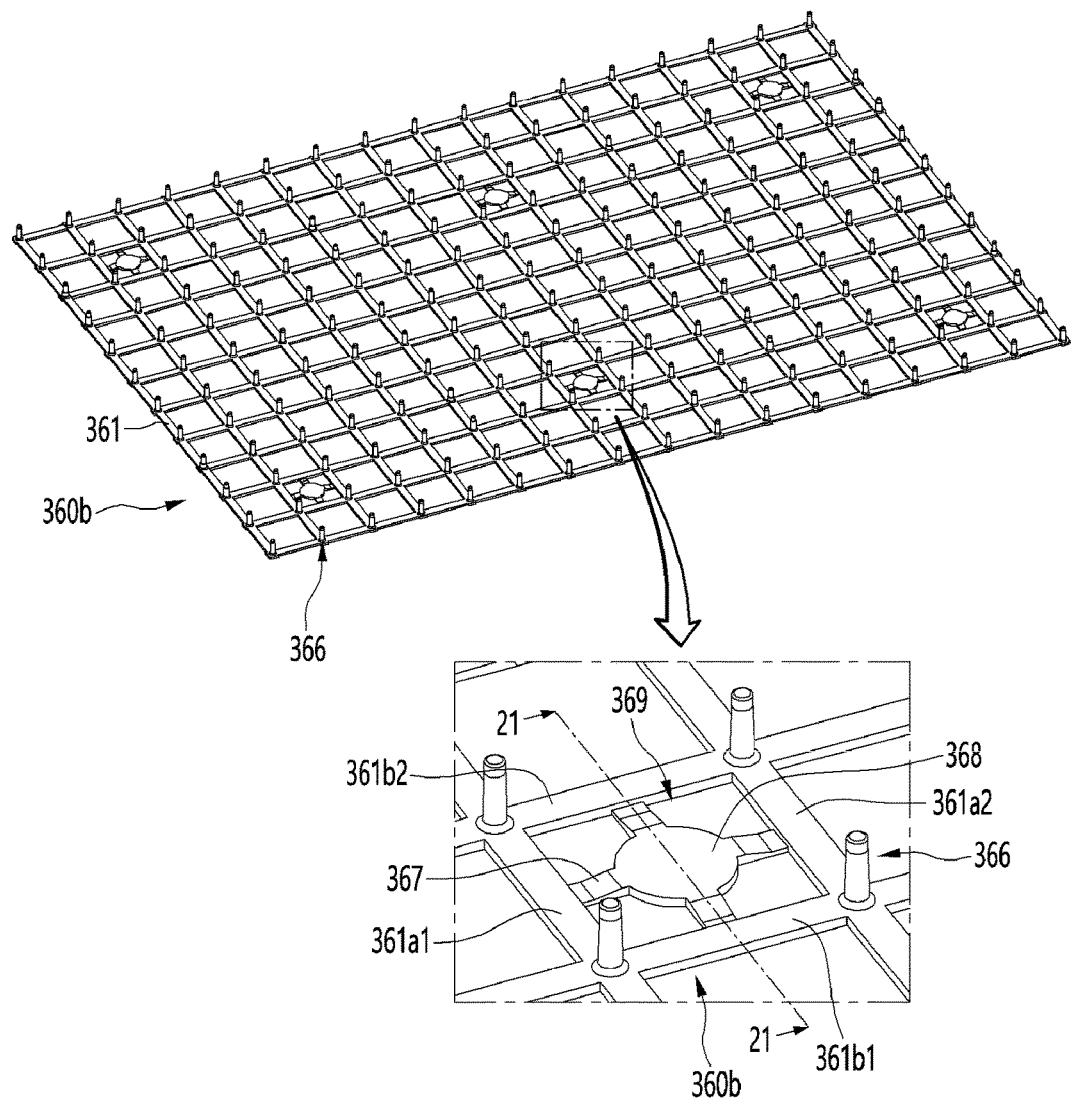
FIG. 20 is a perspective view illustrating a second support.
Figure 21:
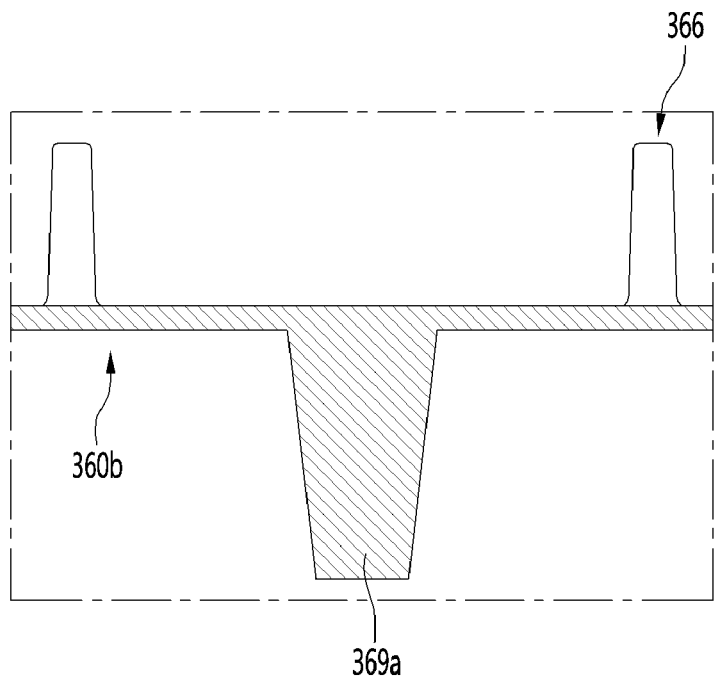
FIG. 21 is a cross-sectional view taken along line 21-21 of FIG. 20.
Figure 22:
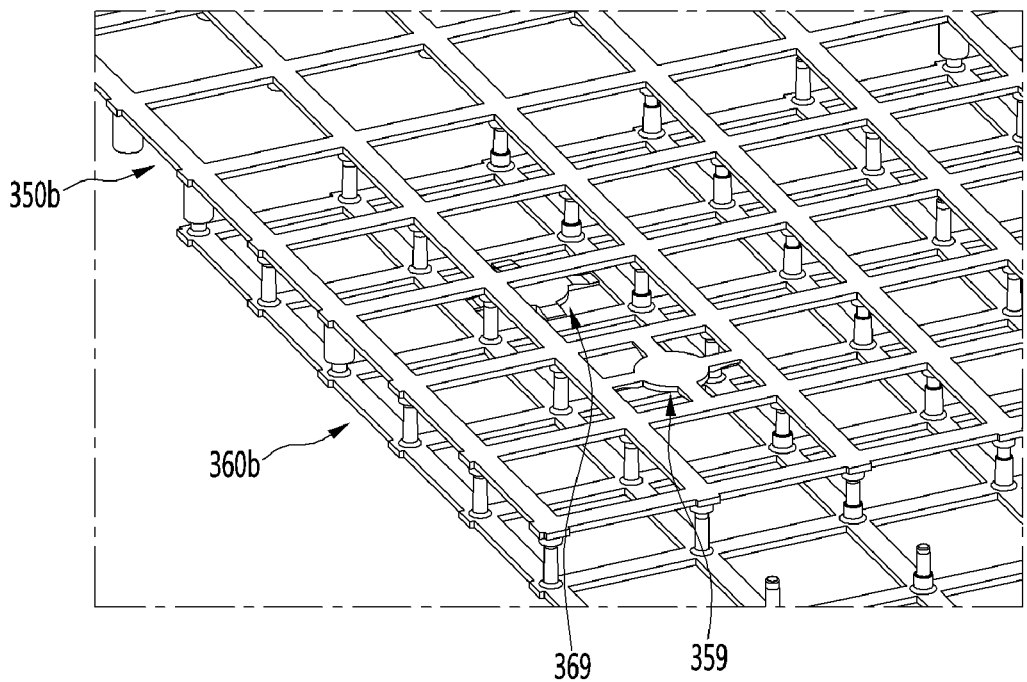
FIG. 22 is a perspective view illustrating a state in which the first support and the second support are coupled.

FIG. 19 is a perspective view illustrating the first support viewed from the lower side, FIG. 20 is a perspective view illustrating a second support, FIG. 21 is a cross-sectional view taken along line 21-21 of FIG. 20, and FIG. 22 is a perspective view illustrating a state in which the first support and the second support are coupled.

Referring to FIGS. 19 to 21, the first support 350*b* and the second support 360*b* may be injection-molded as described above. The first support 350*b* may be manufactured by manufacturing a first mold having a first space for generating the first support 350*b* and then injecting an injection liquid into the first space to harden the injection liquid. Similarly, the second support 360*b* may be manufactured by manufacturing a second mold having a second space for generating the second support 360*b* and then injecting an injection liquid into the second space to harden injection liquid. As such, since the spacer coupling portion of the first support 350*b* and the spacer of the second support 360*b* are important components for maintaining the shape of the vacuum space, the spacer coupling portion of the first support 350*b* and the spacer of the second support 360*b* have to be manufactured with accurate dimensions, and the dimensional tolerance of the spacer coupling portion or spacers should be minimized. To this end, in the present embodiment, the configuration for injecting and dispensing the injection liquid in each mold forming each of the first support 350*b* and the second support 360*b* can be placed at a position spaced apart from the spacer or the spacer coupling portion. For example, a mold gate for injecting an injection liquid in each mold may be disposed at a position corresponding to the through-holes 352 and 362 in each of the supports 350*b* and 360*b*. When the mold gate is disposed at a position corresponding to the through-holes 352 and 362, the mold may include a mold distribution portion for distributing the injection liquid injected through the mold gate to the first space or the second space, and a mold bridge for connecting the mold distribution portion to the first space and the second space. If the mold gate for injecting the injection liquid is disposed at a position corresponding to the spacer 366 or the spacer coupling portion 356 in the mold, there may be a disadvantage in that the height tolerance between the spacer or the spacer coupling portion formed at a position corresponding to the mold gate and the spacer or the spacer coupling portion formed at a position that does not correspond to the mold gate. On the other hand, according to the present invention, this problem can be solved. When the mold is removed after injection of the injection liquid is completed, the first support 350*b* and the second support 360*b* will include the support gate, the support distribution portion, and the support bridge corresponding to the mold gate, the mold distribution portion, and the mold bridge. Hereinafter, the support gate, the support distribution portion, and the support bridges will be collectively referred to as distribution structures 359 and 369.

Since the shape of the distribution structures 359 and 369 may be the same as that of the first support 350*b* and the second support 360*b*, and the position of the distribution structures 359 and 369 may be the same as or symmetrical to that of the first support 350*b* and the second support 360*b*, only the distribution structure 369 formed on the second support 360*b* will be described below. Each of the first support 350*b* and the second support 360*b* may be coupled to each other with a part or all of the distribution structures 359 and 369 removed or may be coupled to each other with the distribution structures 359 and 369 not removed. The distribution structure 369 may include a support distribution portion 368 and a plurality of support bridges 367 extending from the support distribution portion 368 in the radial direction. The support distribution portion 368 may be located in the through-hole 362. One through-hole 362 may be defined by a pair of parallel first extension portions 361*a*1 and 361*a*2 and a pair of second extension portions perpendicular to the pair of first extension portions 361*a*1 and 361*a*2 and parallel to each other. Since each end portion of the pair of second extension portions 361*b*1 and 361*b*2 is connected to each end portion of the pair of first extension portions 361*a*1 and 361*a*2, the pair of first extension portions 361*a*1 and 361*a*2 and the pair of second extension portions 361*b*1 and 361*b*2 may form a through-hole 362 having a substantially rectangular shape. Each of the spacers 366 may be disposed at a connection portion of each of the pair of first extension portions 361*a*1 and 361*a*2 and each of the pair of second extension portions 361*b*1 and 361*b*2. Accordingly, the support distribution portion 368 is disposed to be spaced apart from the spacer 366. The support distribution portion 368 may be formed in a disk shape, for example. The plurality of support bridges 367 may be arranged to be symmetrical with respect to the support distribution portion 368, for example. For example, two support bridges may be connected to each of the pair of first extension portions 361*a*1 and 361*a*2 or may be connected to each of the pair of second extension portions 361*b*1 and 361*b*2. Alternatively, in order to easily distribute the injection liquid to each of the pair of first extension portions 361*a*1 and 361*a*2 and the pair of second extension portions 361*b*1 and 361*b*2, four support bridges 367 may extend from the support distribution portion 368 to be connected to each of the extension portions 361*a*1, 361*a*2, 361*b*1, and 361*b*2. For example, the four support bridges 367 may be disposed at intervals of 90 degrees. In this case, the injection liquid may uniformly flow into the space corresponding to each extension portion in the mold, and thus injection uniformity may be improved. A width of the support bridge 367 may be equal to or greater than a diameter of the spacer 366. A first part extending from the support distribution part 368 in the support bridge 367 may have the same thickness as the support distribution part 368. A thickness of the second part extending from the first part may be thinner than a thickness of the first part. The thickness of the third part extending from the second part and connected to the extension portions 361*a*1, 361*a*2, 361*b*1, and 361*b*2 may be thinner than the thickness of the extension portions 361*a*1, 361*a*2, 361*b*1, and 361*b*2. When the thickness of the third part is thinner than the thickness of the extension portions 361*a*1, 361*a*2, 361*b*1, and 361*b*2, the distribution structure can be easily removed by cutting the third part. The thickness of the first part may be the same as or similar to the thickness of each of the extension portions 361*a*1, 361*a*2, 361*b*1, and 361*b*2 to prevent interference with the radiation resistance sheet.

Each of the molds may further include a mold injection portion for injecting injection liquid during the injection molding process. Accordingly, after completion of the injection molding, the distribution structure 369 may further include a support gate 369a. The support gate 369a may protrude from the support distribution part 368. The support gate 369 may extend in a direction opposite to that of the spacer 366, for example. A diameter of the support gate 369 may be larger than a diameter of the spacer 366. For easy injection of the injection liquid, the diameter of the mold gate may increase toward the mold distribution portion. Correspondingly, the diameter of the support gate 369a may increase toward the support distribution portion 368. In other words, the exit diameter of the support gate 369a may be larger than the entrance diameter thereof. A plurality of mold gates may be provided in the mold for rapid distribution of the injection liquid. Correspondingly, the first and second supports 350b and 360b may include a plurality of distribution structures and thus may include a plurality of support gates 369a. In this case, the plurality of support gates 369a are disposed at spaced apart positions, and the extending directions of each of the support gates 369a are the same. The injection direction of the injection liquid at the mold gate is the same. When the support gate 369a in the second support 360b extends in a direction opposite to the direction in which the spacer 366 extends, in a state in which the second support 360b and the first support 350b are coupled, the support gate 369a does not interfere with the radiation resistance sheet. Accordingly, it is possible to use the support gate 369a without removing it. Of course, the support gate 369a may be removed according to the use position of the support. In addition, when the support gate 369a in the second support 360b extends in a direction opposite to the direction in which the spacer 366 extends, injection is possible with a small injection pressure. The same applies to the support gate of the first support 350b as described above. As described above, the first and second supports 350b and 360b include a plurality of distribution structures 359 and 369, and positions of the plurality of distribution structures will be described below.

As illustrated in FIG. 22, in a state in which the first support 350b and the second support 360b are coupled, the distribution structure 359 of the first support 350b and the distribution structure 369 of the second support 360b does not overlap in the longitudinal direction of the bar (the Y-axis direction, or the vertical direction in the drawing). In other words, the distribution structure 359 of the first support 350b and the distribution structure 369 of the second support 360b are disposed at a misaligned position.

Figure 23:
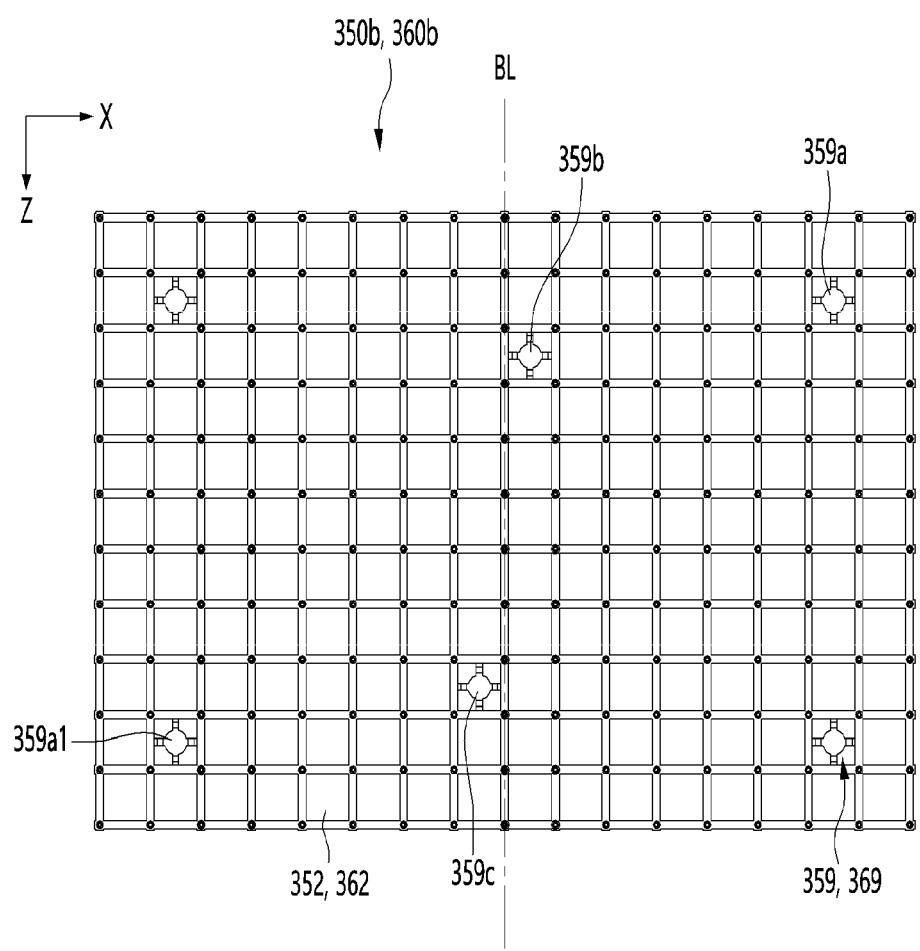
FIG. 23 is a view illustrating an example of the disposition of the distribution structure in the first and second support.

FIG. 23 is a view illustrating an example of the disposition of the distribution structure in the first and second support.

Referring to FIG. 23, it is assumed that the first support 350b and the second support 360b are manufactured to have the same size. For example, the first support 350b may include spacer coupling portions in the seventeenth column and the twelfth row. Also, the second support 360b may include spacers in the seventeenth column and the twelfth row. A plurality of distribution structures may be disposed symmetrically with respect to a point of the bisector BL based on the bisector BL that bisects the length in the X-axis direction in each of the supports 350b and 360b. As an example, the plurality of distribution structures may include a plurality of outer structures 359a and 359a1 positioned adjacent to the corner in each of the supports 350b and 360b and a plurality of inner structures 359b and 359c positioned in an area formed by an imaginary line connecting the plurality of outer structures 359a and 359a1. Although not limited, at least four outer structures 359a and 359a1 may be disposed to be spaced apart from each other in the X-axis and the Z-axis. For example, the at least two outer structures 359a and 359a1 may be spaced apart from each other in the X-axis direction, and the at least two outer structures 359a and 359a1 may be spaced apart from each other in the Z-axis direction. For example, the number of the outer structures 359a and 359a1 may be greater than the number of the inner structures 359b and 359c. In this case, the distance between the two adjacent outer structures 359a and 359a1 is greater than the distance between the two adjacent inner structures 359b and 359c. The plurality of inner structures 359b and 359c may be disposed to be spaced apart from each other in the X-axis and the Z-axis. The plurality of inner structures 359b and 359c may include a first inner structure 359b positioned on one side of the bisector BL and a second inner structure 359c positioned on the other side of the bisector BL. A distance between the first inner structure 359b and the bisector BL may be the same as a distance between the second inner structure 359c and the bisector BL. The number of through-holes 352 and 362 between the first inner structure 359b and the second inner structure 359c may be five or more. The number of through-holes 352 and 362 between the first inner structure 359b and one outer structure 359a adjacent to the first inner structure 359b may be same as the number of the through-holes 352 and 362 between the first inner structure 359b and the second inner structure 359c. The number of through-holes 352 and 362 between the second inner structures 359c and the other outer structure 359a1 adjacent to the second inner structure 359c may be the same as the number of the through-holes 352 and 362 between the first inner structure 359b and the second inner structure 359b. The number of through-holes 352 and 362 between the second inner structure 359c and the other outer structure 359a1 adjacent to the second inner structure 359c may be the same as the number of the through-holes 352 and 362 between the first inner structure 359b and the other outer structure 359a adjacent to the first inner structure 359b. The number of through-holes 352 and 362 between two adjacent structures may be 5 or more and 8 or less. If the number of through-holes 352 and 362 between two adjacent structures is less than 5, there is a high possibility that the injection molding speed is slowed down and the injection liquid is not evenly distributed in the mold. When the number of through-holes 352 and 362 between two adjacent structures exceeds 8, the injection molding speed is increased, but there are disadvantages that the mold structure is complicated, and the working time for removing the distribution structure increase after injection molding is completed.

Figure 24:
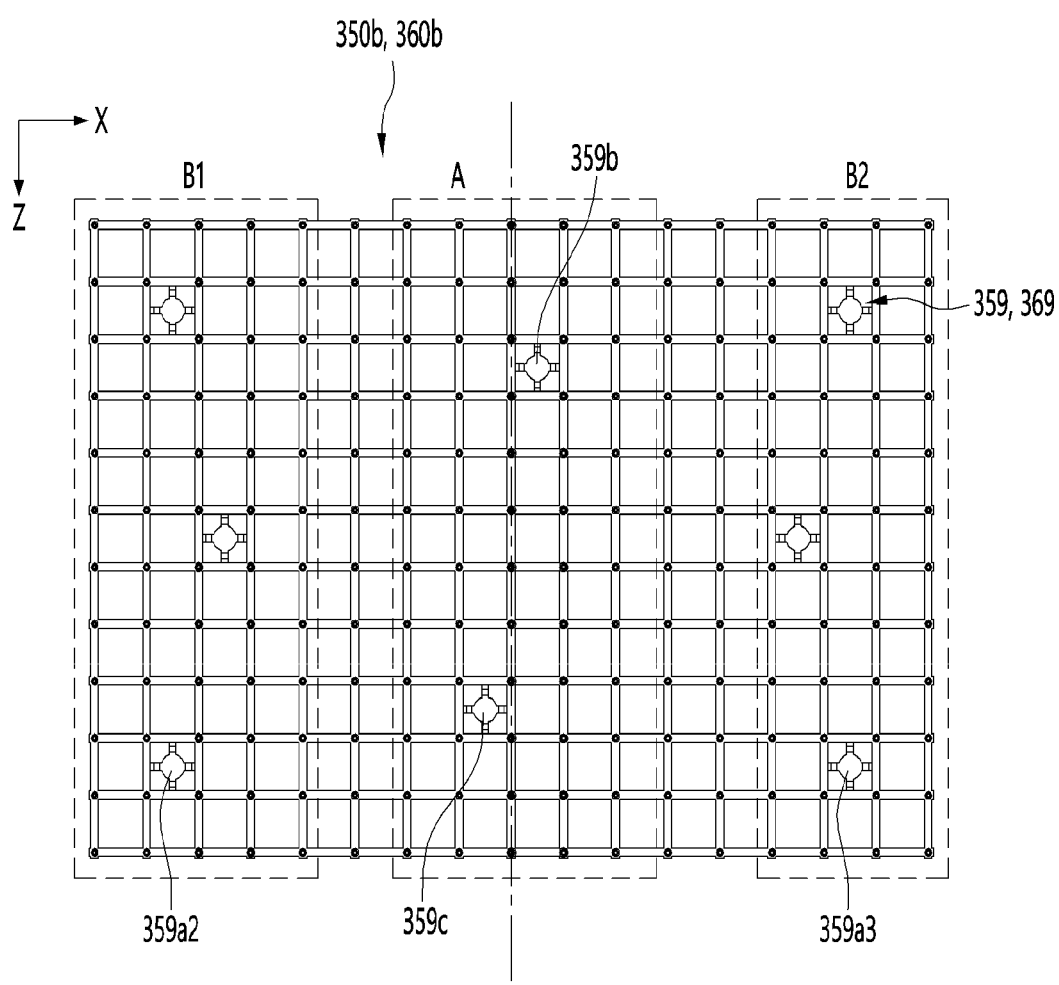
FIG. 24 is a view illustrating another example of the disposition of the distribution structure in the first and second support.

FIG. 24 is a view illustrating another example of the disposition of the distribution structure in the first and second supports.

Referring to FIG. 24, a plurality of distribution structures based on a bisector BL that bisects a length in the X-axis direction in each of the supports 350b and 360b may be disposed to form symmetry with respect to a point of the bisector BL. As an example, the plurality of distribution structures may include the plurality of outer structures 359a2 and 359a3 positioned adjacent to the corner at each of the supports 350b and 360b and the plurality of inner structures 359b and 359c positioned in the area forming an imaginary line connecting the plurality of the outer structure 359a2 and 359a3. The plurality of distribution structures may be divided into three groups. For example, the plurality of distribution structures may include a first group A including the plurality of inner structures 359b and 359c, a second group B1 including a plurality of outer structures 359a2 positioned on one side of the first group A, and A third group B2 including a plurality of outer structures 359a2 positioned on the other side of the first group A. The number of structures in the second group B1 may be greater than the number of structures in the first group A. The number of structures in the third group B2 may be greater than the number of structures in the first group A. The distance between the structures of the first group A may be greater than the distance between the structures of the second group B1. The distance between the structures of the first group A may be greater than the distance between the structures of the third group B2. An area of a triangle connecting the two inner structures 359b and 359c and one outer structure may be larger than an area of a triangle connecting the two outer structures and one inner structure.

The invention claimed is:

1. A vacuum adiabatic body comprising:
   a first plate;
   a second plate separated from the first plate in a first direction to define a vacuum space between the first plate and the second plate;
   a support provided between the first plate and the second plate, wherein the support includes:
     a first support plate,
     a plurality of couplers protruding from the first support plate,
     a second support plate, and
     a plurality of spacers protruding from the second support plate and coupled to the plurality of couplers; and
   a radiation resistance sheet supported by at least one of the plurality of spacers and spaced apart from at least one of the first support plate or the second support plate,
   wherein each of the first and second support plates includes a plurality of through-holes,
   wherein the support includes a plurality of distribution structures that are spaced apart from each other and are provided in two or more of the plurality of through-holes of the first and second support plates, and
   wherein one of the distribution structures includes a support distribution base located in one of the through-holes.

2. The vacuum adiabatic body of claim 1,
   wherein each of the first support plate and the second support plate includes at least one of the distribution structures, the at least one distribution structure of the first support plate is positioned to not overlap the at least one distribution structure of the second support plate in the first direction between the first plate and the second plate.

3. The vacuum adiabatic body of claim 1,
   wherein a plurality of distribution structures are distributed within the support to be symmetrical with respect to a bisector that bisects the first and second support plates.

4. The vacuum adiabatic body of claim 1,
   wherein an adjacent pair of the distribution structures are separated by 5 to 8 through-holes.

5. The vacuum adiabatic body of claim 1,
   wherein the plurality of distribution structures includes:
     a plurality of outer structures positioned within a preset number of the through-holes from exterior corners of the first and second supports plates, and
     a plurality of inner structures positioned more than the preset number of the through-holes from the exterior corners.

6. The vacuum adiabatic body of claim 5,
   wherein a distance between two adjacent ones of the outer structures is longer than a distance between two adjacent ones of the inner structures.

7. The vacuum adiabatic body of claim 5,
   wherein a number of the outer structures is greater than a number of the inner structures.

8. The vacuum adiabatic body of claim 5,
   wherein the plurality of inner structures include a first inner structure positioned on a first side based on a bisector that bisects each of the first and the second support plates, and a second inner structure positioned on a second side of the bisector.

9. The vacuum adiabatic body of claim 8,
   wherein a distance between the first inner structure and the bisector matches a distance between the second inner structure and the bisector.

10. The vacuum adiabatic body of claim 8,
    wherein the first inner structure and an adjacent first one of the outer structures are separated by a first number of the through-holes, and the second inner structure and an adjacent second one of the outer structures are separated by a second number of the through-holes, the first number matching the second number.

11. The vacuum adiabatic body of claim 5,
    wherein the plurality of distribution structures includes
      a first group including the plurality of inner structures,
      a second group including a first plurality of the outer structures positioned on a first side of the first group, and
      a third group including a second plurality of the outer structures positioned on the second side of the first group.

12. The vacuum adiabatic body of claim 11,
    wherein the first group includes a first number of the inner structures, the second group includes a second number of the first plurality of outer structures, and the third group includes a third number of the second plurality of outer structures, and
    wherein of at least one of the second number of the second group or the third number of the third group is greater than the first number of the first group.

13. The vacuum adiabatic body of claim 11,
    wherein at least one of a second distance between the first plurality of outer structures of the second group or a third distance between the second plurality of outer structures of the third group is greater than a first distance between the inner structures of the first group.

14. The vacuum adiabatic body of claim 5,
    wherein an area of a first triangle connecting two of the inner structures and one of the outer structures is larger than an area of a second triangle connecting two of the outer structures and one of the inner structures.

15. The vacuum adiabatic body of claim 1,
    wherein one of the through-holes is defined by a pair of first extensions extending in a third direction and a pair of second extensions extending in a third direction that intersects the second direction, and
    wherein the distribution structure includes
      a support bridge extending from the support distribution base in a radial direction and connected to at least one of the first or second extensions.

16. The vacuum adiabatic body of claim 15,
    wherein the distribution structure includes a pair of the support bridges are provided to extend from the support distribution base in opposite directions.

17. The vacuum adiabatic body of claim 1, wherein the support distribution base is formed as a disk shape.

18. The vacuum adiabatic body of claim 1, wherein the first plate and the second plate are formed in a grid shape.

19. The vacuum adiabatic body of claim 1, wherein one of the spacers includes a first segment and a second segment, the second segment extending from the second support plate, and the first segment extending from the second segment and having a width smaller than a width of the second segment to define a ledge on which the radiation resistance sheet is seated.

20. The vacuum adiabatic body of claim 1, wherein the distribution structure includes a protrusion extending from the support distribution base in the first direction.

\* \* \* \* \*